(12) United States Patent
Arai et al.

(10) Patent No.: US 9,203,557 B2
(45) Date of Patent: Dec. 1, 2015

(54) RECEIVER AND RECEIVING METHOD

(71) Applicant: FUJITSU LIMITED, Kawasaki-shi, Kanagawa (JP)

(72) Inventors: Hiroaki Arai, Kawasaki (JP); Shunji Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 64 days.

(21) Appl. No.: 14/019,204

(22) Filed: Sep. 5, 2013

(65) Prior Publication Data

US 2014/0079161 A1    Mar. 20, 2014

(30) Foreign Application Priority Data

Sep. 14, 2012  (JP) .................................. 2012-202524

(51) Int. Cl.
*H04L 27/06* (2006.01)
*H04L 1/00* (2006.01)

(52) U.S. Cl.
CPC ............ *H04L 1/0054* (2013.01); *H04L 1/0045* (2013.01)

(58) Field of Classification Search
CPC ..... H04L 1/0054; H04L 1/005; H04L 1/0057; H04L 1/0066; H04L 1/0065; H04L 25/067; H04L 1/0045; H04L 1/0059; H04L 1/0055; H04L 27/2647; H04L 1/0052; H04L 27/2649; H04L 25/03216
USPC ................. 375/341, 262, 265, 260, 264, 298, 375/E1.025, E1.028; 714/780, 795, 786, 714/758, 714, 792, 773, 796, 759, 760, 797
See application file for complete search history.

(56) References Cited

U.S. PATENT DOCUMENTS

| | | | | |
|---|---|---|---|---|
| 5,159,608 | A | * 10/1992 | Falconer et al. | ............... 375/130 |
| 8,196,024 | B2 | * 6/2012 | Asirvatham et al. | .......... 714/790 |
| 2002/0059354 | A1 | 5/2002 | Uchida | |

FOREIGN PATENT DOCUMENTS

| | | |
|---|---|---|
| JP | 08-044705 A | 2/1996 |
| JP | 08-101919 A | 4/1996 |
| JP | 08-181617 A | 7/1996 |
| JP | 2002-149397 A | 5/2002 |

OTHER PUBLICATIONS

3GPP TS 36.212 version 8.8.0 Release 8, ETSI TS 136 212 V8.8.0, Jan. 2010, pp. 1-61.

* cited by examiner

*Primary Examiner* — Rahel Guarino
(74) *Attorney, Agent, or Firm* — Arent Fox LLP

(57) ABSTRACT

A receiver including: a memory, and a processor configured to calculate a plurality of soft decision values based on a received symbol to which a plurality of bits are mapped, to select at least one first soft decision value of the plurality of soft decision values, to calculate at least one relative value of at least one second soft decision value of the plurality of soft decision values other than the at least one first soft decision value, based on the at least one first soft decision value, to store the at least one first soft decision value and the at least one relative value, in the memory, and to estimate the plurality of bits based on the at least one first soft decision value and the at least one relative value which are stored in the memory.

20 Claims, 25 Drawing Sheets

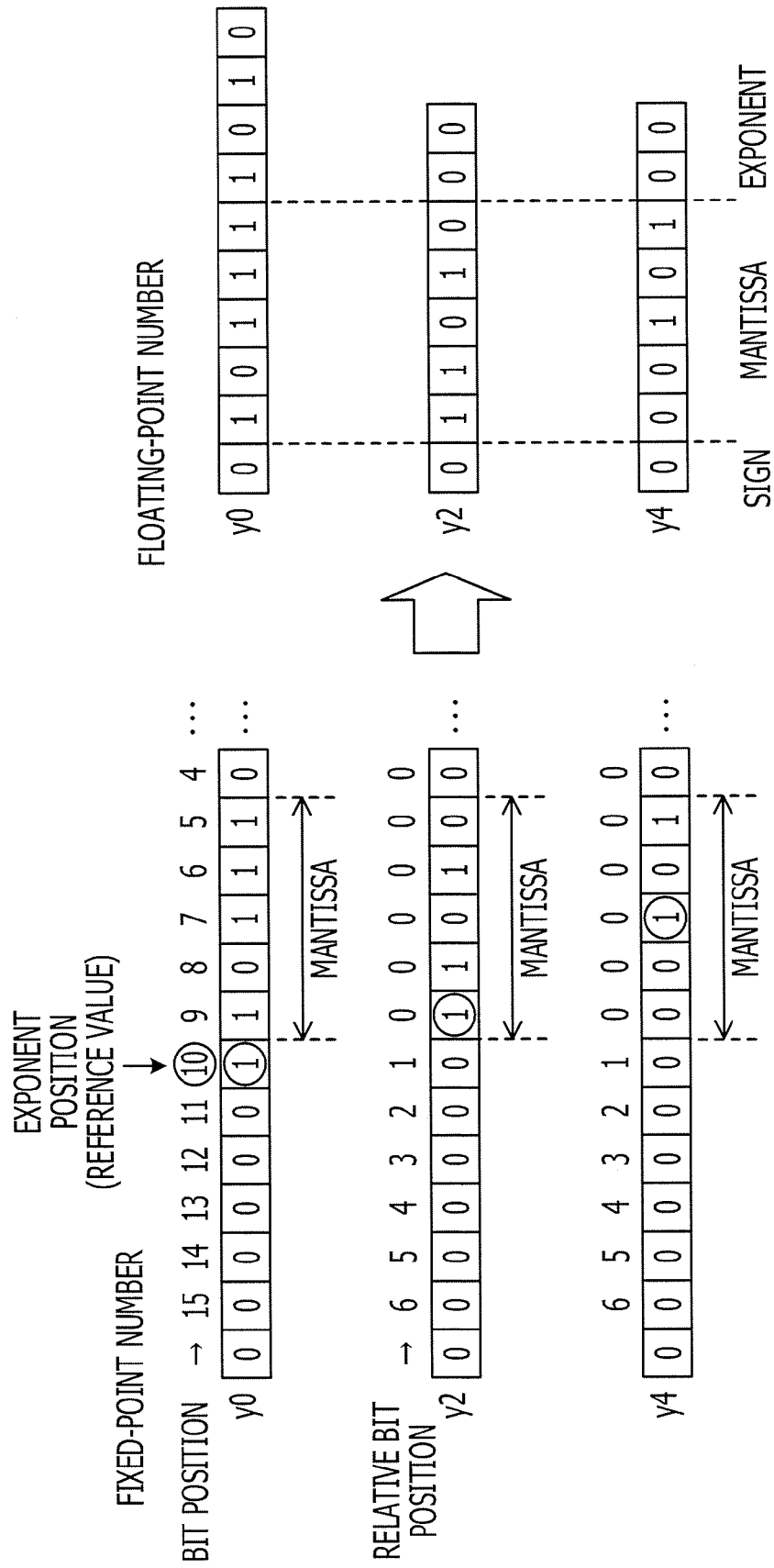

FIG. 15

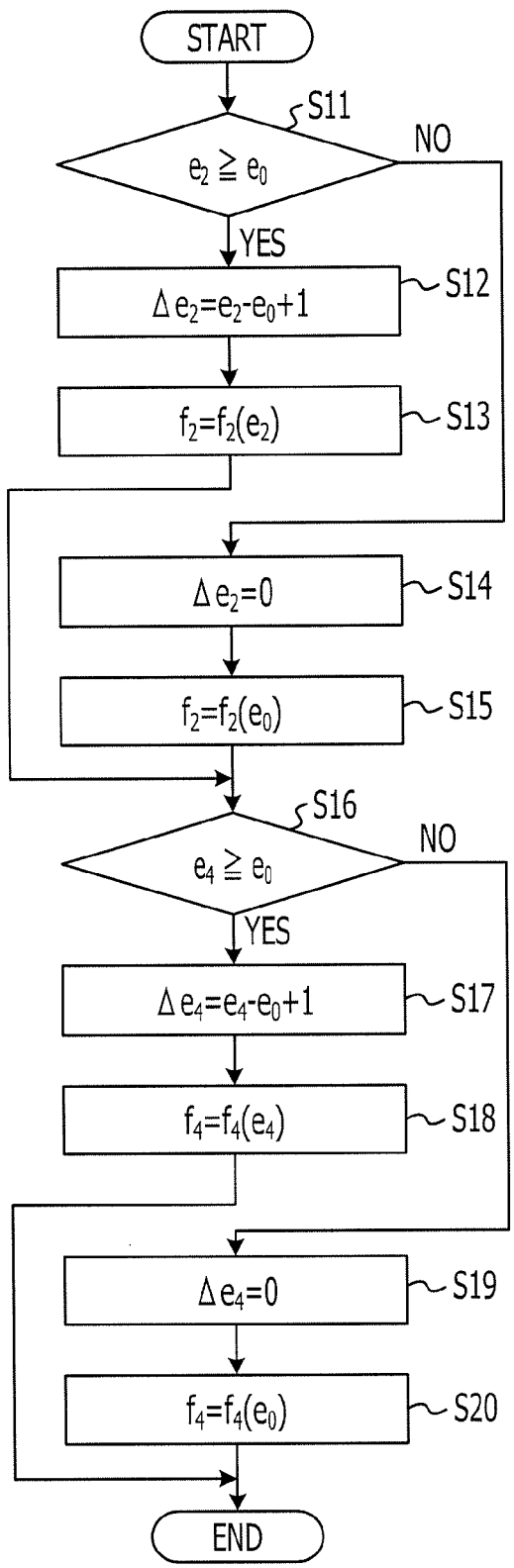

$e_0$: EXPONENT VALUE OF $y_0$
$e_2$: EXPONENT VALUE OF $y_2$
$e_4$: EXPONENT VALUE OF $y_4$
$f_2$: EXPONENT VALUE OF $y_2$
$f_4$: EXPONENT VALUE OF $y_4$
$\Delta e_2$: RELATIVE EXPONENT VALUE OF $y_2$
$\Delta e_4$: RELATIVE EXPONENT VALUE OF $y_4$
$f_2(e_0)$: 5 BITS FOLLOWING EXPONENT OF $e_0$ OF $y_2$
$f_2(e_2)$: 5 BITS FOLLOWING EXPONENT OF $e_2$ OF $y_2$
$f_4(e_0)$: 5 BITS FOLLOWING EXPONENT OF $e_0$ OF $y_4$
$f_4(e_4)$: 5 BITS FOLLOWING EXPONENT OF $e_4$ OF $y_4$

FIG. 20

FIXED-POINT NUMBER

| | BIT POSITION → | 15 | 14 | 13 | 12 | 11 | 10 | 9 | 8 | 7 | 6 | 5 | ... |
|---|---|---|---|---|---|---|---|---|---|---|---|---|---|
| SYMBOL R0 | y0 | 0 | 0 | 0 | 0 | 0 | 0 | ⑨ | 1 | 0 | 1 | 1 | 1 | ... |

MAXIMUM VALUE

| | | 15 | 14 | 13 | 12 | 11 | 10 | 9 | 8 | 7 | 6 | 5 | ... |
|---|---|---|---|---|---|---|---|---|---|---|---|---|---|
| SYMBOL R1 | y0 | 0 | 0 | ⑬ 1 | 0 | 0 | 0 | 0 | 1 | 0 | 0 | 0 | ... |

| | | 15 | 14 | 13 | 12 | 11 | 10 | 9 | 8 | 7 | 6 | 5 | ... |
|---|---|---|---|---|---|---|---|---|---|---|---|---|---|
| SYMBOL R2 | y0 | 0 | 0 | 0 | ⑪ 1 | 0 | 1 | 0 | 0 | 0 | 0 | ... |

...

| | | 15 | 14 | 13 | 12 | 11 | 10 | 9 | 8 | ⑦ | 6 | 5 | ... |
|---|---|---|---|---|---|---|---|---|---|---|---|---|---|
| SYMBOL R9 | y0 | 0 | 0 | 0 | 0 | 0 | 0 | 0 | 0 | 1 | 1 | 1 | ... |

RECEIVER AND RECEIVING METHOD

CROSS-REFERENCE TO RELATED APPLICATION

This application is based upon and claims the benefit of priority from the prior Japanese Patent Application No. 2012-202524 filed on Sep. 14, 2012, the entire contents of which are incorporated herein by reference.

FIELD

The embodiments discussed herein are related to a receiver used in a communication system and a receiving method.

BACKGROUND

In wireless communication systems, multi-level modulation is used to increase a channel capacity. For example, in quadrature phase shift keying (QPSK), 2 bits are mapped in one symbol. In quadrature amplitude modulation (16QAM), 4 bits are mapped in one symbol. In 64QAM, 6 bits are mapped in one symbol. In the 3rd Generation Partnership Project (3GPP), standard specifications of Long Term Evolution (LTE) for use in portable telephone systems are under discussion.

A receiver (receiving apparatus) includes a demodulator and a decoder. The demodulator performs, for example, a soft decision on a received symbol and outputs a result as soft decision value. The soft decision value represents a likelihood of a determination of each bit as being "0" or "1" for the received symbol. The soft decision value output from the demodulator is temporarily stored in a memory. The decoder calculates estimated bits from the soft decision value stored in the memory. Each estimated bit is an estimated value for a transmitted bit.

In the receiver configured in the above-described manner, the soft decision value may be converted from a fixed point format into a floating point format, and resultant data may be stored. Representing the soft decision value in the floating point format allows the decoder to reduce a calculation amount associated with the calculation of the estimated bit. Each floating-point number includes a sign, a mantissa, and an exponent.

A description of a related technique may be found, for example, in 3GPP TS 36.212 V8.8.0.

SUMMARY

According to an aspect of the invention, a receiver includes a memory, and a processor configured to calculate a plurality of soft decision values based on a received symbol to which a plurality of bits are mapped, to select at least one first soft decision value of the plurality of soft decision values, to calculate at least one relative value of at least one second soft decision value of the plurality of soft decision values other than the at least one first soft decision value, based on the at least one first soft decision value, to store the at least one first soft decision value and the at least one relative value, in the memory, and to estimate the plurality of bits based on the at least one first soft decision value and the at least one relative value which are stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram illustrating a method of processing soft decision value according to an embodiment.

FIG. 15 is a flow chart illustrating a process according to an embodiment.

FIG. 20 is a diagram illustrating a method of setting a minimum reference value.

DESCRIPTION OF EMBODIMENTS

In a receiver, it is preferable to minimize a size of a memory used to store soft decision value between a demodulator and a decoder.

Embodiments disclosed here provide techniques to reduce a memory size to store soft decision value in the receiver.

Figure 1:
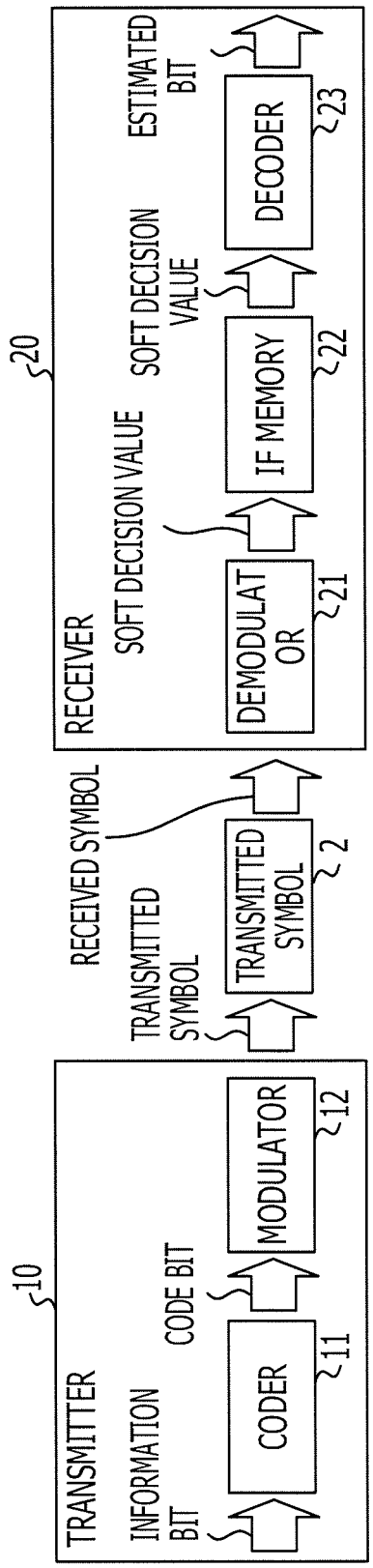
FIG. 1 is a diagram illustrating a configuration of a wireless communication system.

FIG. 1 illustrates a configuration of a wireless communication system including a receiver according to an embodiment. As illustrated in FIG. 1, a wireless communication system 1 includes a transmitter (transmitting apparatus) 10 and a receiver (receiving apparatus) 20.

The transmitter 10 includes a coder 11 and a modulator 12. The coder 11 codes information bits into code bits. The information bits are data transmitted to the receiver 20. There is no particular restriction on a coding method. For example, a turbo coding method may be employed as the coding method. The modulator 12 maps the code bits generated by the coder 11 into transmission symbols. More specifically, for example, the modulator 12 maps code bits into transmission symbols using multi-level modulation such as QPSK, 16QAM, 64QAM, or the like. That is, the modulator 12 maps a plurality of code bits into each transmission symbol.

The transmitter 10 generates a wireless signal for conveying the transmission symbols and transmits the resultant wireless signal to the receiver 20. Note that the wireless signal transmitted from the transmitter 10 is transmitted to the receiver 20 via a wireless communication channel 2.

The receiver 20 includes a demodulator 21, an interface memory 22, and a decoder 23. The demodulator 21 demodulates the received symbols and generates soft decision value (or soft decision values). In this decoding process, the demodulator 21 generates soft decision value for each of code bits mapped in the received symbol. The interface memory 22 temporarily stores the soft decision value generated by the demodulator 21. The soft decision value is stored in a floating point format in the interface memory 22. The decoder 23 estimates the information bits based on the soft decision value stored in the interface memory 22.

In the present embodiment, as described above, the receiver 20 generates the soft decision value from the received symbols in which the code bits are mapped by the multi-level modulation method. The receiver 20 has a capability of reducing the number of bits of the soft decision value to reduce the memory size of the interface memory 22. To provide better understanding of the configuration and the operation of the receiver 20, a description is given below as to the multi-level modulation and the soft decision.

In the multi-level modulation, a plurality of code bits are mapped into one symbol. Taking 64QAM as an example, the multi-level modulation is described in further detail below. In 64QAM, 6 code bits are mapped in 1 symbol. Hereinafter, code bits mapped in one symbol are denoted by $b_0$ to $b_5$.

Figure 2:
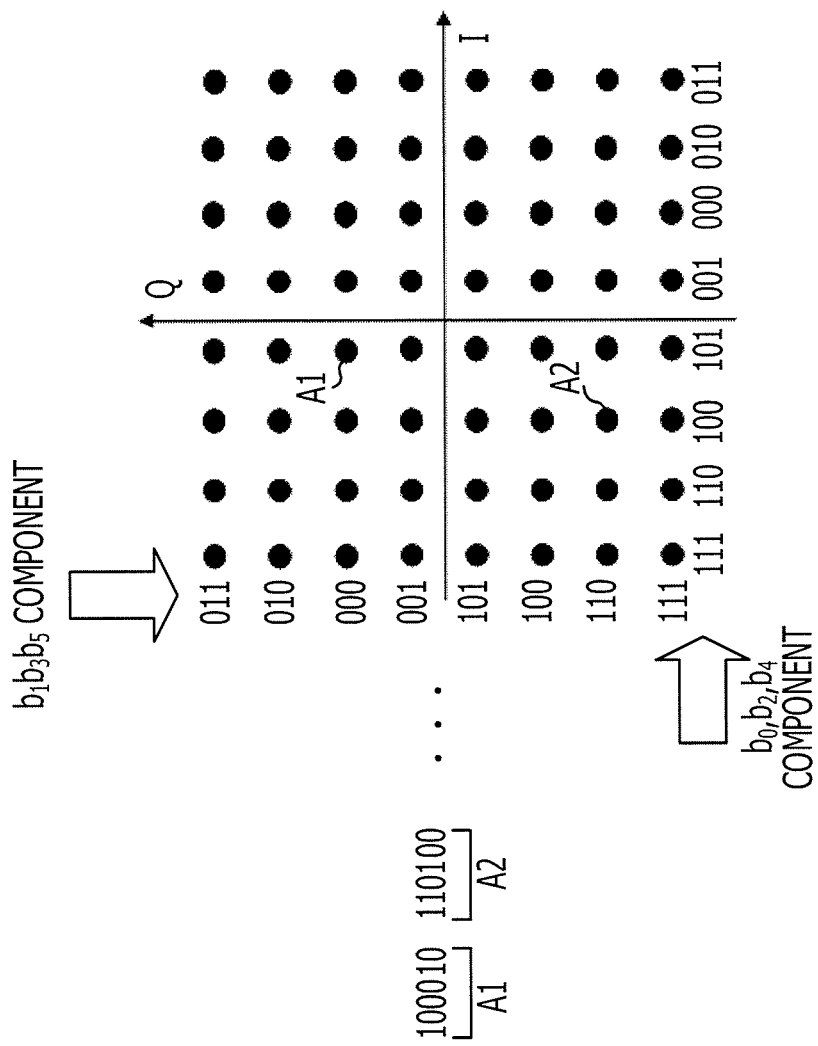
FIG. 2 is a diagram illustrating signal points in a constellation.

FIG. 2 illustrates signal points in a constellation. A horizontal axis represents an I component, and a vertical axis represents a Q component. The code bits $b_0$ to $b_5$ are put in the 64QAM constellation as illustrated in FIG. 2. For example, $b_0$, $b_2$, and $b_4$ represent I components, and $b_1$, $b_3$, and $b_5$ represent Q components.

Code bits A1 "100010" are divided into $(b_0, b_2, b_4)=(1, 0, 1)$ and $(b_1, b_3, b_5)=(0, 0, 0)$. Thus, the code bits A1 are mapped to a signal point A1. On the other hand, code bits A2 "110100" are divided into $(b_0, b_2, b_4)=(1, 0, 0)$ and $(b_1, b_3, b_5)=(1, 1, 0)$. Thus, the code bits A2 are mapped to a signal point A2.

The transmitter 10 generates transmission symbols from the code bits in the above-described manner, and transmits the generated transmission symbols. The symbols are received by the receiver 20 via the wireless communication channel 2 as illustrated in FIG. 1. However, locations of signal points of received symbols detected by the receiver 20 (that is, the amplitude and the phase of the received signals) are disturbed by noise or the like. Thus, before the receiver 20 determines a value (that is, "0" or "1") of each code bit mapped to a received symbol, the receiver 20 generates soft decision value indicating a likelihood of a result of the determination as to whether each code bit is "0" or "1" using the demodulator 21. Thereafter, the decoder 23 acquires an estimated value of each code bit from the soft decision value.

FIG. 3 illustrates a method of generating soft decision value in the demodulation process. In the following description, as an example, a method of generating soft decision value for an I component is explained. Note that a method of generating soft decision value for a Q component is substantially the same as the method of generating soft decision value for the I component.

In FIG. 3, Δ denotes a received symbol R detected by the receiver 20. In the received symbol R, 6 code bits $b_0$ to $b_5$ are mapped. Note that bits determined from the I components of the received symbol are $b_0$, $b_2$, $b_4$ as described above with reference to FIG. 2.

Figure 3A:
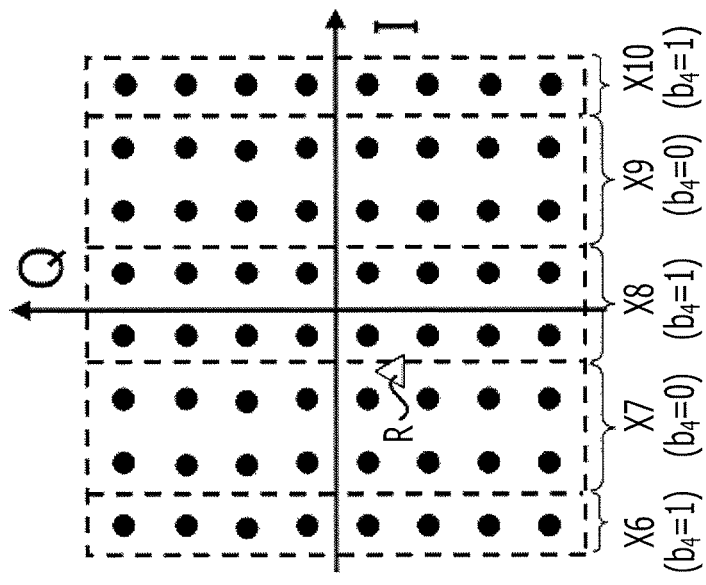
FIGS. 3A, 3B, and 3C are diagrams illustrating a method of generating soft decision value in a decoding process.

The bit $b_0$ is determined based on a region X1 to X2 illustrated in FIG. 3A. In a case where a received symbol is detected in the region X1, then it is determined that $b_0=1$. On the other hand, when a received symbol is detected in the region X2, then it is determined that $b_0=0$. In the present example, a received symbol R is detected in the region X1, and thus it is determined that $b_0=1$. Note that the result of soft decision indicates the likelihood of the result of the decision being correct. That is, the soft decision value for the bit $b_0$ indicates the likelihood that the received symbol R is located in the region X1.

Figure 3B:
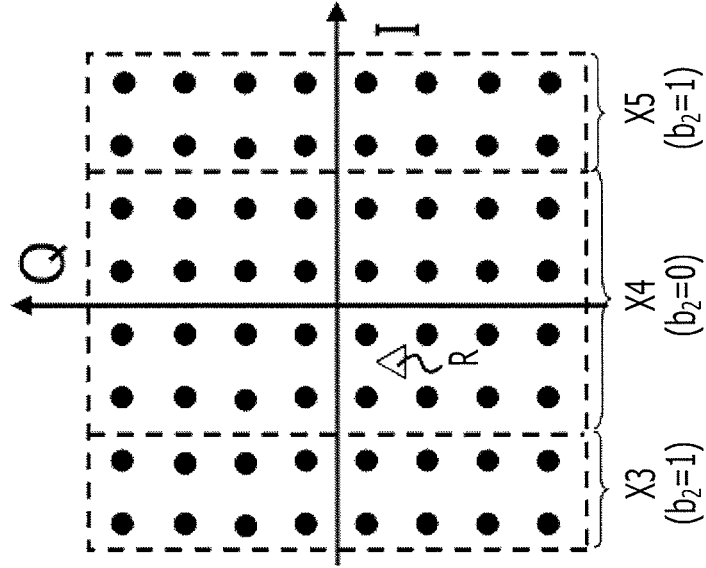

As for the bit $b_2$, the determination is made based on regions X3 to X5 illustrated in FIG. 3B. When a received symbol is detected in the region X3 or X5, it is determined that $b_2=1$. On the other hand, when a received symbol is detected in the region X4, it is determined that $b_2=0$. In the present example, a received symbol R is detected in the region X4. Thus, the soft decision value for the bit $b_2$ indicates the likelihood of the received symbol R being located in the region X4.

Figure 3C:
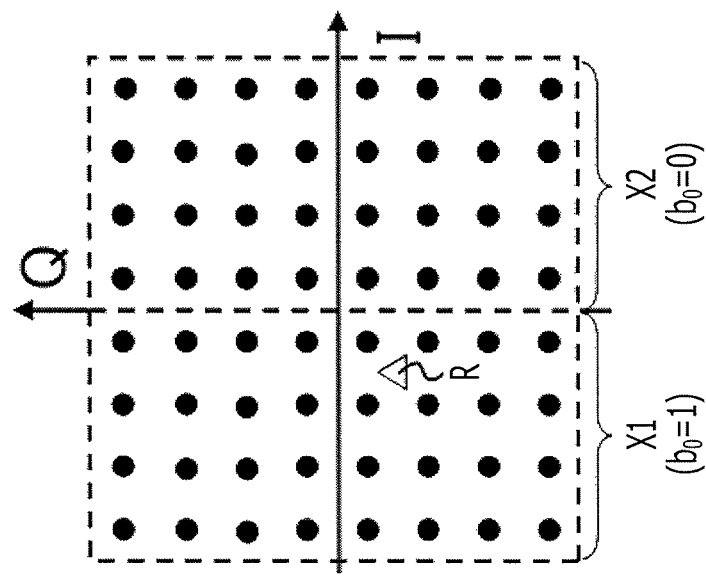

As for the bit $b_4$, the determination is made based on regions X6 to X10 illustrated in FIG. 3C. When a received symbol is detected in the region X6, X8, or X10, it is determined that $b_4=1$. When a received symbol is detected in the region X7 or X9, it is determined that $b_4=0$. In the present example, a received symbol R is detected in the region X7. Thus, the soft decision value for the bit $b_4$ indicates the likelihood of the received symbol R being located in the region X7.

Figure 4:
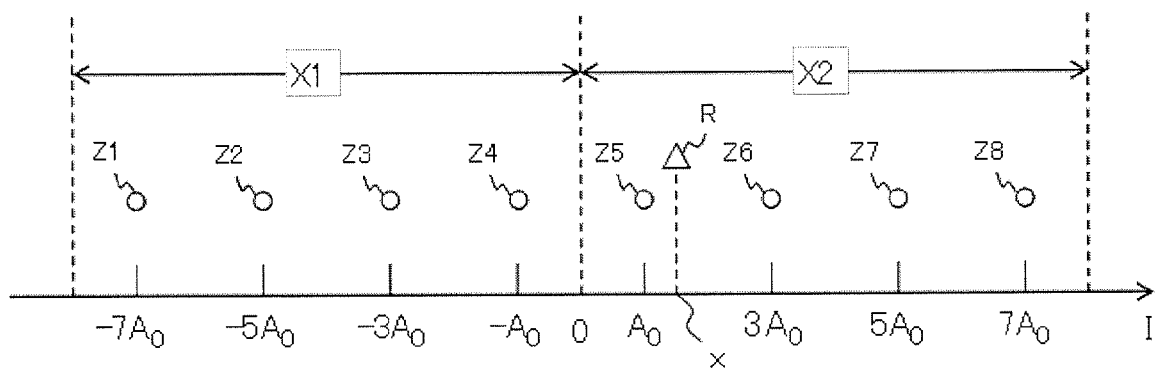
FIG. 4 is a diagram illustrating an example of a method of calculating soft decision value.

FIG. 4 illustrates an example of a method of calculating soft decision value. In the following description, as an example, a method of determining soft decision value of the I component is explained. Note that soft decision value for the Q component is calculated using a method substantially similar to the method of calculating the soft decision value for the I component.

In FIG. 4, 8 signal points Z1 to Z8 denotes I components of a symbol transmitted using 64QAM. Here, a coordinate of an intersection between an I axis and a Q axis in the constellation is set to 0. Furthermore, it is assumed that a symbol-to-symbol interval in the constellation is $2A_0$. The I components of the signal points Z1 to Z8 are respectively located at $-7A_0$, $-5A_0$, $-3A_0$, $-A_0$, $A_0$, $3A_0$, $5A_0$, and $7A_0$.

In this case, soft decision value for the I components of the received symbol R (soft decision value for bit $b_0$, $b_2$, and $b_4$) is calculated as follows. Note that in the following calculation, x denotes an I component of the received symbol R and it is assumed that $0<x\leq 2A_0$.

The likelihood of the determination on the bit $b_0$ is given by a difference between the square of the shortest distance from the received symbol R to the signal points Z1 to Z4 in the region X1 and the square of the shortest distance from the received symbol R to the signal points Z5 to Z8 in the region X2. In the example illustrated in FIG. 4, among signal points Z1 to Z4, the signal point Z4 is the closest to the received symbol R, and the distance between the received symbol R and the signal point Z4 is $x+A_0$. On the other hand, among the signal points Z5 to Z8, the signal point Z5 is the closest to the received symbol R, and the distance between the received symbol R and the signal point Z5 is $x-A_0$. Thus, the likelihood $\Lambda_0$ indicating the likelihood of the determination on the bit $b_0$ (that is, the soft decision value for the bit $b_0$) is calculated according to an equation described below, where $1/2\sigma^2$ is a coefficient corresponding to Gaussian noise, and $\sigma$ is a variance of a Gaussian distribution.

$$\Lambda_0 = \frac{1}{2\sigma^2}\{(x+A_0)^2 - (x-A_0)^2\} = \frac{2}{\sigma^2}A_0 x$$

By performing the calculation for various values of x, the likelihood $\Lambda_0$ for the bit $b_0$ is given as follows.

$$|x| \leq 2A_0 : \Lambda_0 = \frac{2}{\sigma^2}A_0 x$$

$$2A_0 < |x| \leq 4A_0 : \Lambda_0 = \text{sign}(x) \cdot \frac{4}{\sigma^2}A_0(|x|-A_0)$$

$$4A_0 < |x| \leq 6A_0 : \Lambda_0 = \text{sign}(x) \cdot \frac{6}{\sigma^2}A_0(|x|-2A_0)$$

$$6A_0 < |x| : \Lambda_0 = \text{sign}(x) \cdot \frac{8}{\sigma^2}A_0(|x|-3A_0)$$

$$\text{sign}(x) = -1 (x<0)$$

$$\text{sign}(x) = 1 (x \geq 0)$$

The likelihood $\Lambda_2$ for the bit $b_2$ is given as follows.

$$|x| \leq 2A_0 : \Lambda_2 = \frac{4}{\sigma^2}A_0(-|x|+3A_0)$$

$$2A_0 < |x| \leq 6A_0 : \Lambda_2 \frac{2}{\sigma^2}A_0(-|x|+4A_0)$$

$$6A_0 < |x| : \Lambda_2 = \frac{4}{\sigma^2}A_0(-|x|+5A_0)$$

The likelihood $\Lambda_4$ for the bit $b_4$ is given as follows.

$$|x| \leq 4A_0 : \Lambda_4 = \frac{2}{\sigma^2}A_0(|x|+4A_0)$$

$$4A_0 < |x| : \Lambda_4 = \frac{2}{\sigma^2}A_0(-|x|+6A_0)$$

The calculation described above is performed by the demodulator 21. That is, the demodulator 21 calculates the likelihood of the determination for each of the bits $b_0$, $b_2$, and $b_4$ based on the I components of the received symbol R. Similarly, the demodulator 21 calculates the likelihood of the determination for each of the bits $b_1$, $b_3$, and $b_5$ based on the Q components of the received symbol R. The demodulator 21 outputs a calculation result as soft decision value.

Hereinafter, the soft decision value for the bits $b_0$ to $b_5$ will also be referred to as soft decision value y0 to y5. Furthermore, soft decision value y0 to y5 expressed in the fixed point format will also be referred to as fixed-point numbers y0 to y5, while soft decision value y0 to y5 expressed in the floating point format will also be referred to as floating-point numbers y0 to y5. In figures, y0 to y5 are represented using subscripts as $y_0$ to $y_5$. Note that y0 to y5 are synonymous with $y_0$ to $y_5$.

Figure 5:
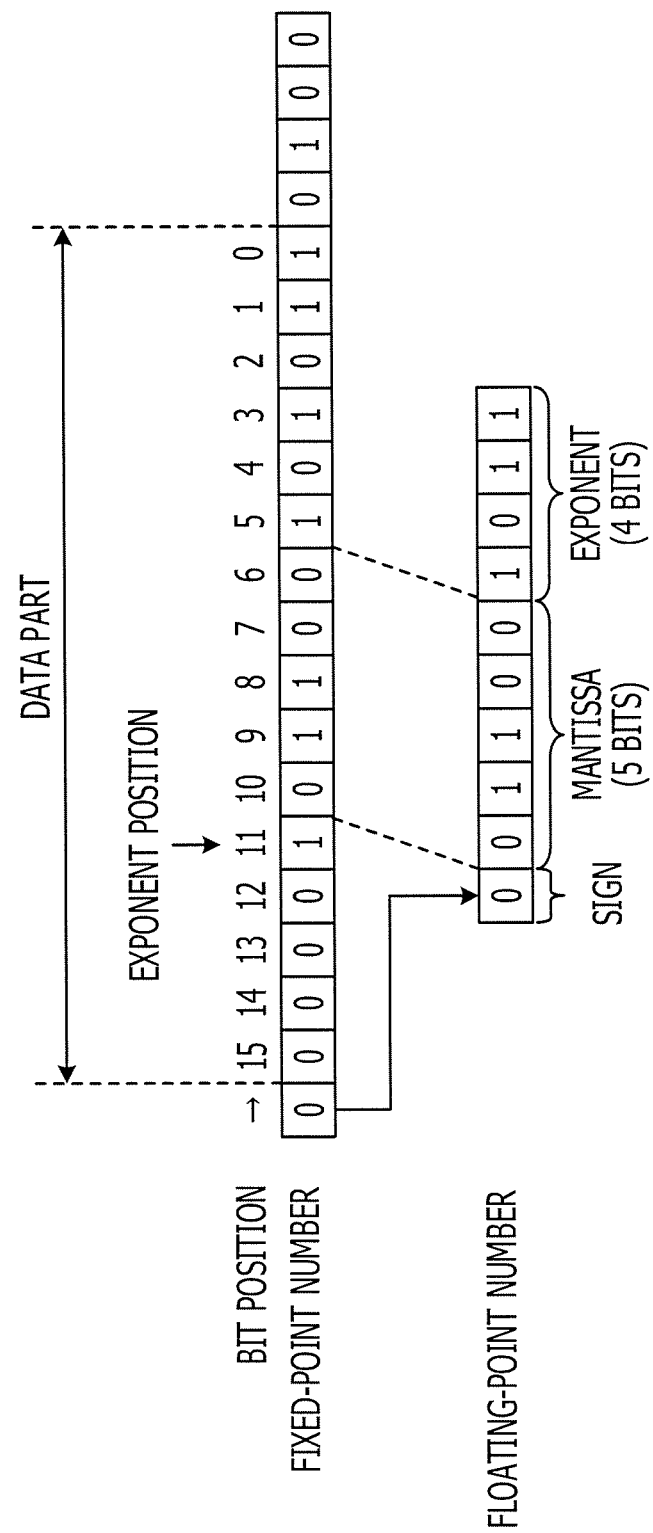
FIG. 5 is a diagram illustrating a method of converting a fixed-point number into a floating-point number.

The demodulator 21 generates soft decision value y0 to y5 for each received symbol and outputs the generated soft decision value y0 to y5. In the present embodiment, each piece of soft decision value y0 to y5 is expressed by a 21-bit fixed-point number as illustrated in FIG. 5. Each piece of soft decision value includes 1-bit sign and 16-bit data part, and further includes 4-bit information following the data part.

Figure 6:
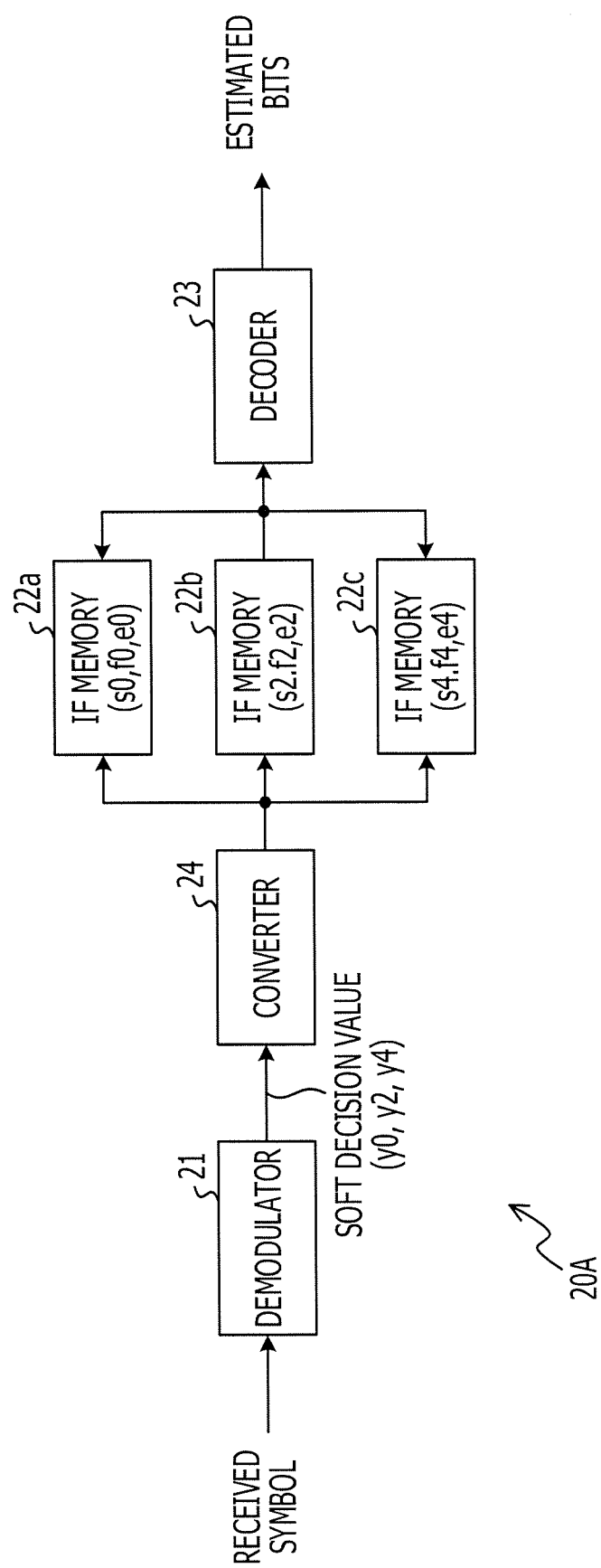
FIG. 6 is a diagram illustrating an example of a configuration of a receiver.

FIG. 6 illustrates an example of a configuration of the receiver. In FIG. 6, the receiver 20A includes a demodulator 21, a converter 24, IF memories 22a to 22c, and a decoder 23. Note that the example illustrated in FIG. 6 is configured to process the code bits $b_0$, $b_2$, and $b_4$. The code bits $b_1$, $b_3$, and $b_5$ may be processed by a configuration similar to that for processing the code bits $b_0$, $b_2$, and $b_4$.

The demodulator 21 outputs soft decision value y0 to y5 associated with the code bits $b_0$ to $b_5$ mapped to the received symbol. In the following description, as an example, soft decision value y0, y2, and y4, of soft decision value y0 to y5 output by the demodulator 21 are explained.

The converter 24 converts each piece of soft decision value y0, y2, and y4 from the fixed-point format into the floating-point format. In the present example, the floating-point numbers output by the converter 24 are expressed in a format including a 1-bit sign, a 5-bit mantissa, and a 4-bit exponent. In this case, the conversion from a fixed-point number to a floating-point number may be performed as illustrated in FIG. 5.

(1) The first bit of the fixed-point number is set as the sign of the floating-point number. In the example illustrated in FIG. 5, the first bit of the fixed-point number is "0", and thus "0" is set as the sign of the floating-point number.

(2) The data part of the fixed-point number is searched sequentially starting from the high-order bit to find a first change in value. A bit position at which the first change in value occurs is set as the exponent of the floating-point number. Hereinafter, the bit position identified in the above-described manner will also be referred to as an exponent position. In the example illustrated in FIG. 5, "0" appears successively at bit positions "15" to "12" of the fixed-point number, and "1" appears for the first time at a bit position "11". That is, "11" is obtained as the exponent position. Thus, "$1011_{(2)}$" is set as the exponent of the floating-point number. Note that the subscript "(2)" indicates that the value is expressed in a binary number.

(3) 5 bits immediately following the exponent position of the fixed-point number are set as the mantissa of the floating-point number. In the example illustrated in FIG. 5, the fixed-point number has values "0", "1", "1", "0", and "0" at respective bit positions "10", "9", "8", "7", and "6". Thus, "$01100_{(2)}$" is set as the mantissa of the floating-point number.

The IF memories 22a to 22c respectively store soft decision value y0, y2, and y4 converted by the converter 24 into the floating-point numbers. More specifically, the IF memory 22a stores a sign s0, a mantissa f0, and an exponent e0 representing soft decision value y0 for each received symbol. Similarly, the IF memory 22b stores a sign s2, a mantissa f2, and an exponent e2 representing soft decision value y2. The IF memory 22c stores a sign s4, a mantissa f4, and an exponent e4 representing soft decision value y4. Note that e0 to e5 are denoted, in figures, as $e_0$ to $e_5$ using subscripts. Thus e0 to e5 are synonymous with $e_0$ to $e_5$.

The decoder 23 estimates the information bits based on the soft decision value stored in the IF memories 22a to 22c. For example, in the case where the coder 11 illustrated in FIG. 1 performs coding using the turbo coding, the decoder 23 estimates the information bits based on the soft decision value by performing the turbo decoding. The turbo coding is a known technique, and thus a further detailed description thereof is omitted.

Figure 7:
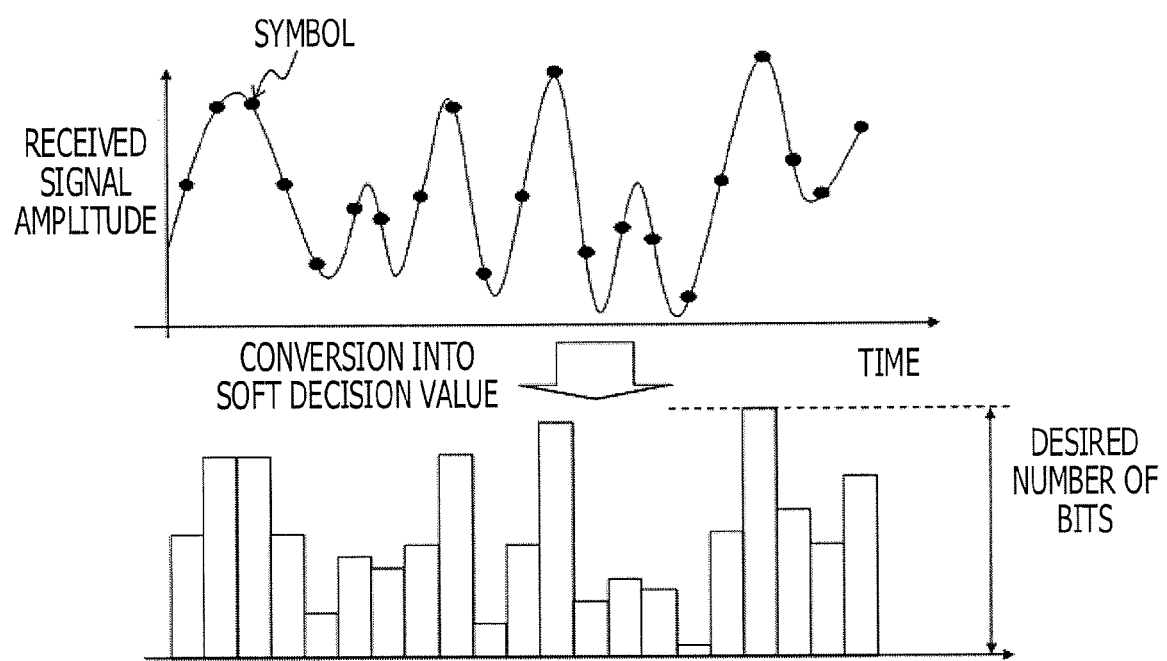
FIG. 7 is a diagram illustrating the amplitude of a received signal and the number of bits of soft decision value.

The number of bits desired to represent soft decision value depends on the amplitude of the received signal. When the received signal has a large amplitude as illustrated in FIG. 7 (or when the received signal has a large change in the amplitude), a greater number of pits are desired to represent the soft decision value. In the example illustrated in FIG. 5, the data part of the fixed-point number representing soft decision value includes 16 bits. In this case, when a fixed-point number is converted into a floating-point number, 4 bits are desired to represent an exponent.

According to an embodiment described below, the receiver is configured to have a function of reducing the number of bits desired to represent soft decision value. An example is described below as to a method and a configuration that allow it to reduce the number of bits of an exponent of a floating-point number representing soft decision value.

Figure 8:
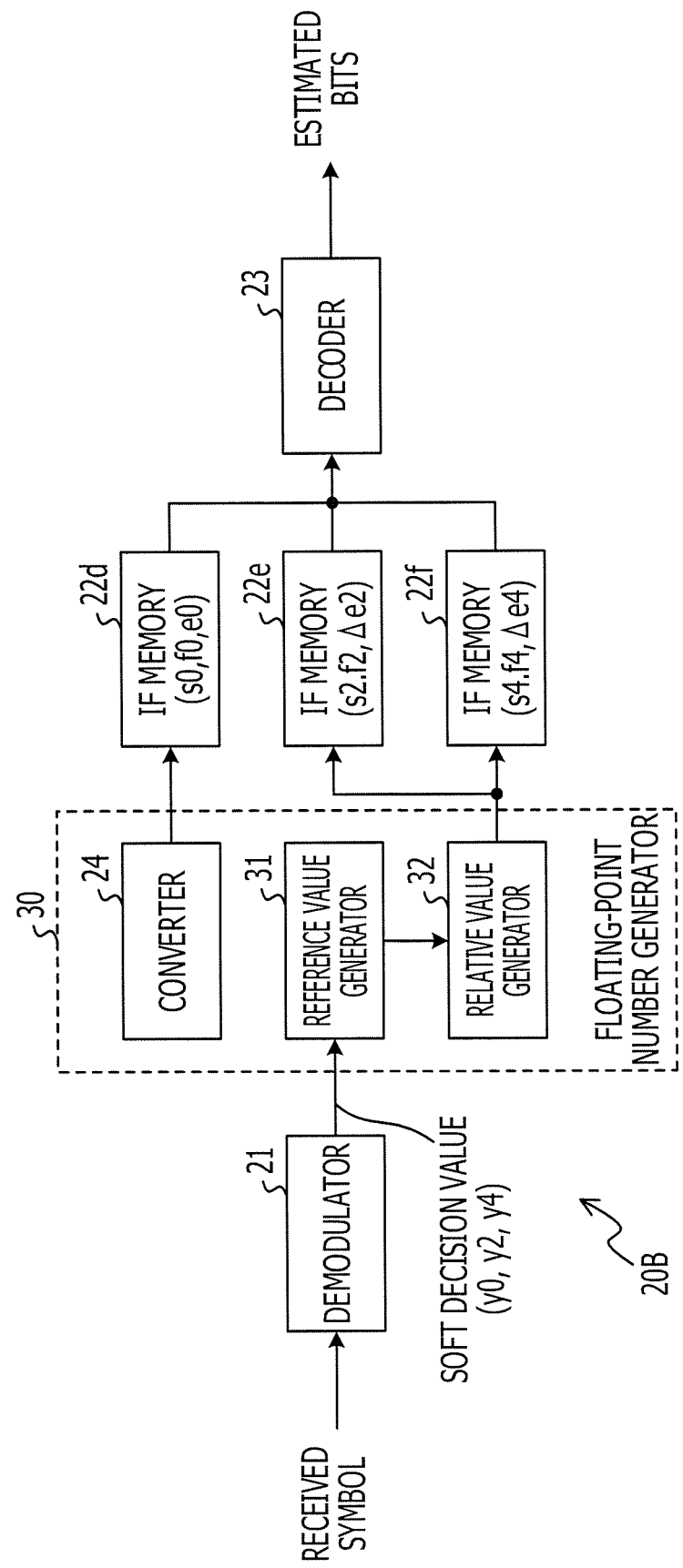
FIG. 8 is a diagram illustrating a configuration of a receiver according to an embodiment.

FIG. 8 illustrates a configuration of the receiver according to an embodiment. In FIG. 8, the receiver 20B includes a demodulator 21, a floating-point number generator 30, IF memories 22d to 22f, and a decoder 23. Note that the example illustrated in FIG. 8 is configured to process code bits $b_0$, $b_2$, and $b_4$. Note that code bits $b_1$, $b_3$, and $b_5$ may be processed by a configuration substantially similar to that for processing the code bits $b_0$, $b_2$, and $b_4$.

The demodulator 21 generates soft decision value y0 to y5 associated with a received symbol as described above. In the following description, soft decision value y0, y2, and y4 are explained below.

The floating-point number generator 30 includes a converter 24, a reference value generator 31, and a relative value generator 32. The converter 24 converts soft decision value y0, y2, and y4 from the form of fixed-point numbers into the form of floating-point numbers. In the present example, each floating-point number expressing soft decision value includes a 1-bit sign s, a 5-bit mantissa f, and a 4-bit exponent e. That is, the converter 24 generates soft decision value y0, y2, and y4 described below for each received symbol.

soft decision value y0: s0, f0, e0;
soft decision value y2: s2, f2, e2; and
soft decision value y4: s4, f4, e4.

The reference value generator 31 generates a reference value for use in representing the soft decision value using a relative value. More specifically, the reference value generator 31 generates a reference value based on one of a plurality of pieces of soft decision value y0, y2, and y4l (for example, based on soft decision value y0). Alternatively, the reference value generator 31 may generate a reference value based on soft decision value of a plurality of received symbols. Alternatively, the reference value generator 31 may generate a reference value based on soft decision value of a past received symbol. The method of generating the reference value will be described in further detail later.

The relative value generator 32 converts part of the soft decision value y0, y2, and y4 into relative floating-point numbers expressed by relative values with respect to the reference value. For example, in a case where the reference value generator 31 generates the reference value based on the soft decision value y0, the relative value generator 32 converts the respective soft decision value y2 and y4 into relative floating-point numbers. In this case, the soft decision value y2 and y4 are respectively expressed by relative values with respect to the soft decision value y0.

In the present example, the relative value generator 32 converts the exponent of the floating-point number representing the soft decision value into a relative value. Here let it be assumed that, for example, soft decision value y0 is specified as the soft decision value for generating the reference value. In this case, the reference value generator 31 outputs an exponent e0 of the soft decision value y0 as the reference value. In response, based on the reference value e0, the relative value generator 32 converts the exponents e2 and e4 of the respective soft decision value y2 and y4 into relative values as described below.

$\Delta e2 = e2 - e0$
$\Delta e4 = e4 - e0$

Note that $\Delta e2$ is a relative value of the exponent of the soft decision value y2 and $\Delta e4$ is a relative value of the exponent of the soft decision value y4.

The IF memory 22d stores the soft decision value in the original form in which the exponent is not converted into the relative value. In the present example, the IF memory 22d stores the floating-point number (s0, f0, e0) representing the soft decision value y0.

The IF memories 22e and 22f respectively store the soft decision value in the forms in which the exponents are converted into the relative values by the relative value generator 32. That is, the IF memory 22e stores the floating-point number (s2, f2, $\Delta e2$) representing the soft decision value y2, and the IF memory 22f stores the floating-point number (s4, f4, $\Delta e4$) representing the soft decision value y4.

The decoder 23 estimates a plurality of bits mapped to the received symbol based on the soft decision value stored in the IF memories 22d to 22f. The operation of the decoder 23 is substantially the same in the receiver 20A illustrated in FIG. 6 and in the receiver 20B illustrated in FIG. 8. However, in the receiver 20B illustrated in FIG. 8, the decoder 23 may have a function of inversely converting the exponents $\Delta e2$ and $\Delta e4$ representing relative values into exponents e2 and e4, respectively.

Figure 9A:
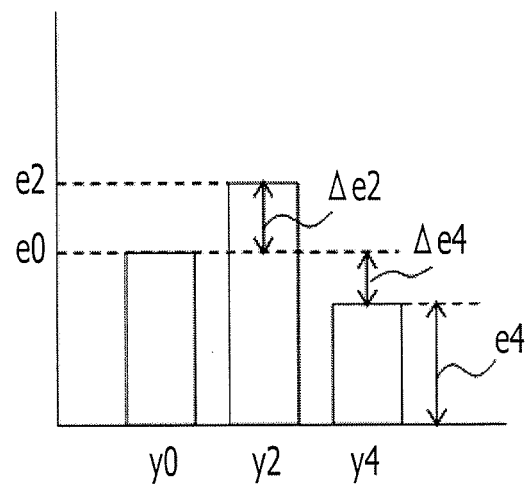
FIGS. 9A and 9B are diagrams illustrating a reduction in the number of bits of soft decision value.
Figure 9B:
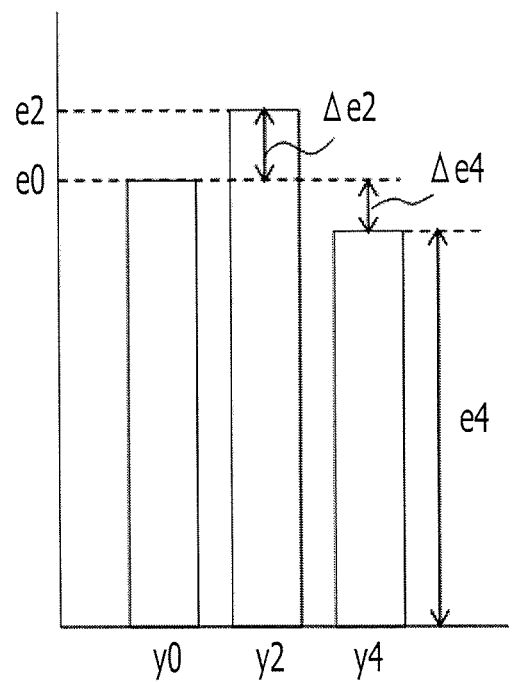

FIGS. 9A and 9B illustrate a manner of reducing the number of bits of soft decision value. In FIGS. 9A and 9B, exponents e0, e2, and e4 of soft decision value y0, y2, and y4 are illustrated. FIG. 9A illustrates soft decision value for a received signal with a small amplitude, while FIG. 9B illustrates soft decision value for a received signal with a large amplitude.

As is illustrated in FIGS. 9A and 9B, a change in the amplitude of the received signal results in a change in magnitude of soft decision value. However, a difference among soft decision value y0, y2, y4 in the symbol is small. Therefore, the relative value $\Delta e2$ corresponding to the difference between y2 and y0 is small relative to e2. Similarly, the relative value $\Delta e4$ corresponding to the difference between y4 and y0 is small relative to e4. Therefore, by converting the floating-point number representing soft decision value into a relative value, it is possible to reduce the number of bits desired to represent the soft decision value.

Thus, in the receiver 20B illustrated in FIG. 8, the soft decision value y2 and y4 are converted into the relative values and the resultant relative values are stored in the IF memories 22e and 22f. As illustrated in FIGS. 9A and 9B, the conversion of the soft decision value into the relative values results in a reduction in the number of bits. Thus, compared with the IF memories 22b and 22c in the receiver 20A illustrated in FIG. 6, it is allowed to reduce the sizes of the IF memories 22e and 22f.

In the receiver 20B illustrated in FIG. 8, the floating-point number generator 30 may first convert the fixed-point numbers y0, y2, and y4 representing soft decision value into floating-point numbers y0, y2, and y4 and then convert the exponents of the floating-point numbers y2 and y4 into relative values. Alternatively, the floating-point number generator 30 may convert the fixed-point number y0 into the floating-point number y0 and may generate relative floating-point numbers y2 and y4 directly from the fixed-point numbers y2 and y4. The relative floating-point numbers y2 and y4 are floating-point numbers y2 and y4 whose exponent is converted into a relative value.

Figure 10:
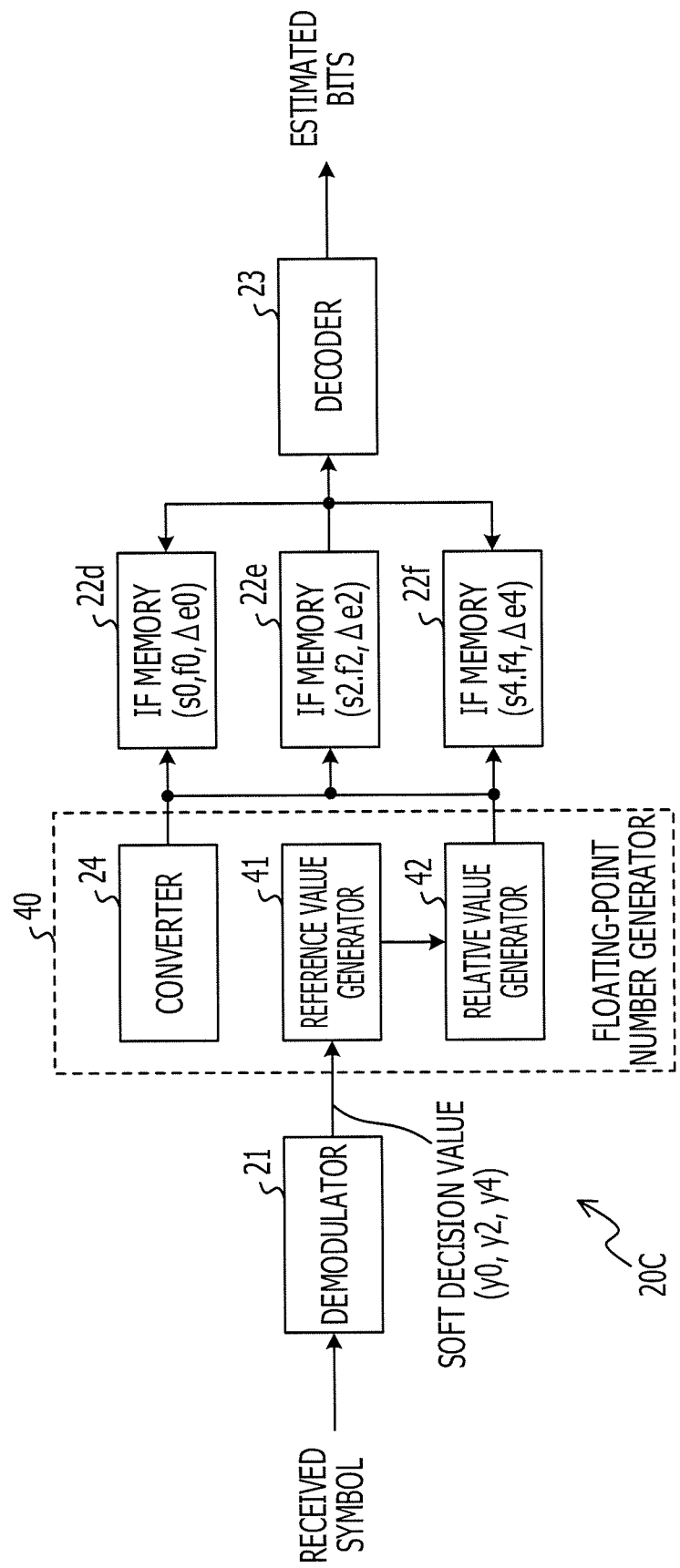
FIG. 10 is a diagram illustrating a configuration of a receiver according to an embodiment.

FIG. 10 illustrates a configuration of a receiver according to another embodiment. In FIG. 10, the receiver 20C includes a demodulator 21, a floating-point number generator 40, IF memories 22g to 22i, and a decoder 23. In the example illustrated in FIG. 10, the configuration is for processing code bits $b_0$, $b_2$, and $b_4$. Note that code bits $b_1$, $b_3$, and $b_5$ may be processed by a configuration substantially similar to that for processing the code bits $b_0$, $b_2$, and $b_4$.

The demodulator 21 generates soft decision value y0 to y5 associated with a received symbol as described above. In the following description, soft decision value y0, y2, and y4 are explained below.

The floating-point number generator 40 includes a converter 24, a reference value generator 41, and a relative value generator 42. The converter 24 converts each of soft decision value y0, y2, and y4 expressed in fixed-point number into floating-point numbers. The reference value generator 41, as with the reference value generator 31 illustrated in FIG. 8, generates a reference value for use in representing the soft decision value using a relative value. Note that the reference value E generated by the reference value generator 41 is used in the conversion into relative values for all pieces of soft decision value y0, y2, and y4 generated from the received symbol.

The relative value generator 42 converts the respective pieces of soft decision value y0, y2, and y4 into relative floating-point numbers expressed by relative values with respect to the reference value E. In the present embodiment, the relative value generator 42 converts the exponent of the floating-point number representing the soft decision value into a relative value. In this case, the relative value generator 42 converts the exponents e0, e2 and e4 of the respective soft decision value y0, y2 and y4l into relative values based on the reference value E as described below.

$\Delta e0 = e0 - E$ $\Delta e2 = e2 - E$ $\Delta e4 = e4 - E$

Note that $\Delta e0$, $\Delta e2$, and $\Delta e4$ are relative values of the exponents of the respective pieces of soft decision value y0, y2, and y4.

The IF memories 22g to 22i respectively store the soft decision value in the forms in which the exponents are converted into the relative values by the relative value generator 42. The IF memory 22g stores the floating-point number (s0, f0, $\Delta e0$) representing the soft decision value y0. The IF memory 22h stores the floating-point number (s2, f2, $\Delta e2$) representing the soft decision value y2. The IF memory 22i stores the floating-point number (s4, f4, $\Delta e4$) representing the soft decision value y4.

The decoder 23 estimates a plurality of bits mapped to the received symbol based on the soft decision value stored in the IF memories 22g to 22i. The operation of the decoder 23 is substantially the same in the receiver 20A illustrated in FIG. 6 and in the receiver 20C illustrated in FIG. 10. However, in the receiver 20C illustrated in FIG. 10, the decoder 23 may have a function of inversely converting the exponents $\Delta e0$, $\Delta e2$, and $\Delta e4$ representing relative values into exponents e0, e2, and e4, respectively.

Thus, in the receiver 20C illustrated in FIG. 10, the soft decision value y0, y2, and y4 are respectively converted into the relative values and the resultant relative values are stored in the IF memories 22g, 22h, and 22i. The conversion of the soft decision value into the relative values results in a reduction in the number of bits. Thus, compared with the IF memories 22a to 22c in the receiver 20A illustrated in FIG. 6, it is allowed to reduce the sizes of the IF memories 22g to 22i.

In the receiver 20C illustrated in FIG. 10, the floating-point number generator 40 may first convert the fixed-point numbers y0, y2, and y4 representing the soft decision value into floating-point numbers y0, y2, and y4 and then convert the exponents of the respective floating-point numbers y0, y2 and y4 into relative values. Alternatively, the floating-point number generator 40 may generate relative floating-point numbers y0, y2, and y4 directly from the fixed-point numbers y 0, y2, and y4. The relative floating-point numbers y0, y2, and y4 are floating-point numbers y0, y2, and y4 whose exponent is converted into a relative value.

The demodulator 21, the decoder 23, and the floating-point number generators 30 and 40 illustrated in FIG. 8 or 10 may be realized using, for example, a digital signal processor. Alternatively, the demodulator 21, the decoder 23, and the floating-point number generators 30 and 40 may be realized using a hardware circuit. Alternatively, the demodulator 21, the decoder 23, and the floating-point number generators 30 and 40 may be realized using a combination of software and hardware.

First Embodiment

Figure 11:
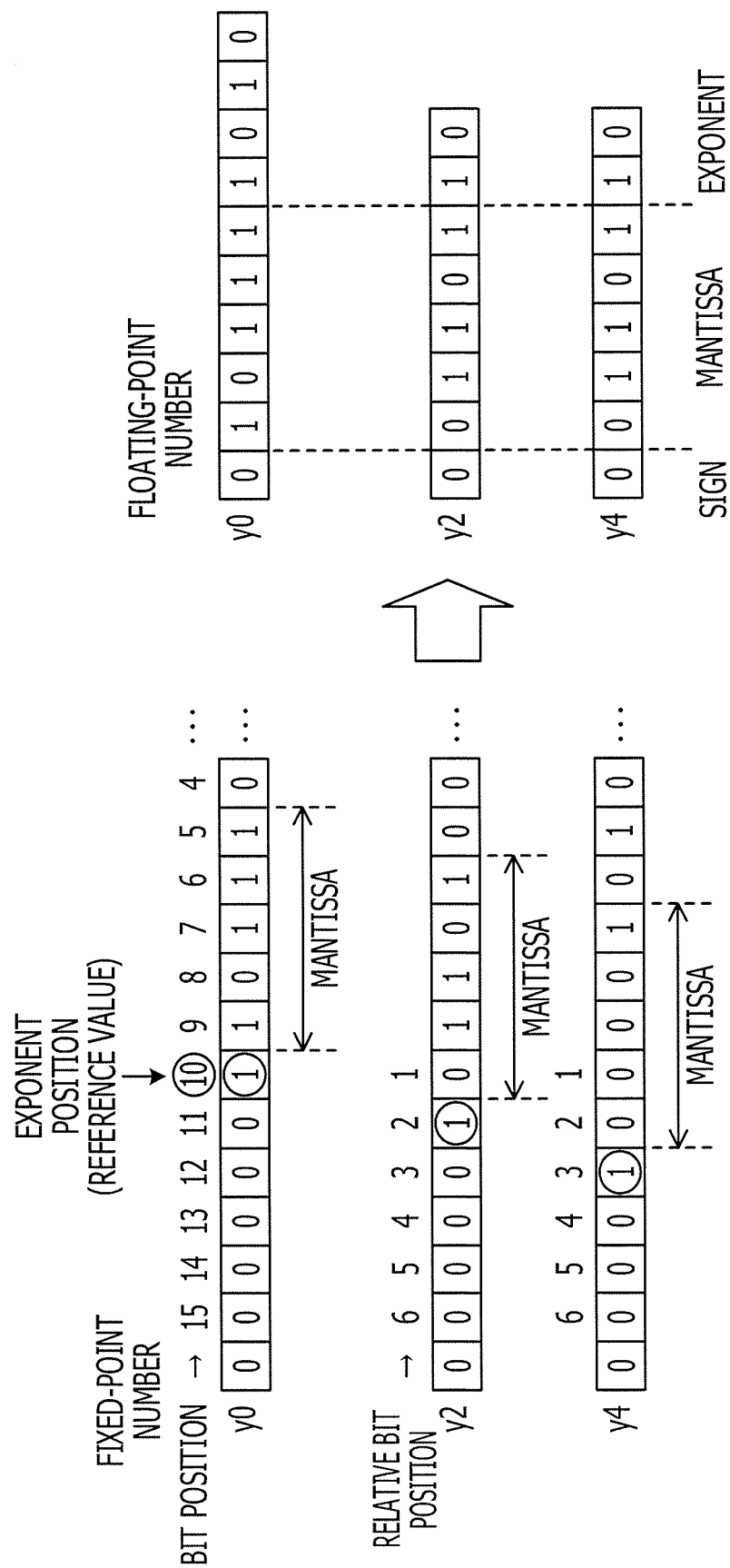
FIG. 11 is a diagram illustrating a method of processing soft decision value according to an embodiment.

FIG. 11 illustrates a method of processing soft decision value according to a first embodiment. The processing on soft decision value according to the first embodiment may be performed, for example, by the receiver 20B illustrated in FIG. 8.

The demodulator 21 demodulates a received symbol and generates soft decision value y0, y2, and y4. The soft decision value y0, y2, and y4 output from the demodulator 21 are in the form of fixed-point numbers.

Hereinafter, the fixed-point numbers representing the soft decision value y0, y2, and y4 will also be denoted simply as the fixed-point numbers y0, y2, and y4, and the floating-point numbers representing the soft decision value y0, y2, and y4 will also be denoted simply as the floating-point numbers y0, y2, and y4.

In the example illustrated in FIG. 11, the soft decision value y0 is specified as a reference. Alternatively, another soft decision value may be specified as the reference. Hereinafter, the soft decision value specified as the reference will also be referred to as reference soft decision value. In the case where the soft decision value y0 is specified as the reference, the soft decision value y2 and y4 are respectively expressed by relative values with respect to the soft decision value y0. Hereinafter, the soft decision value expressed by the relative values with respect to the reference soft decision value will also be referred to as relative soft decision value.

The reference soft decision value y0 is converted into a floating-point number using the method described above with reference to FIG. 5. That is, the reference soft decision value y0 is converted into the floating-point number as described below.

(1) The first bit of the fixed-point number y0 is set as the sign of the floating-point number y0. In the example illustrated in FIG. 11, the first bit of the fixed-point number y0 is "0", and thus "0" is set as the sign of the floating-point number y0.

(2) The data part of the fixed-point number y0 is searched sequentially starting from the high-order bit to find a first change in value. A bit position number indicating the bit position at which the first change in value occurs is set as the exponent of the floating-point number. Hereinafter, the bit position identified in the above-described manner will also be referred to as an exponent position, and the number assigned to the bit position to indicate the exponent position will also be referred to as an exponent value. In the example illustrated in FIG. 11, "0" appears successively at bit positions "15" to "11" of the fixed-point number y0, and "1" appears for the first time at a bit position "10". That is, "10" is obtained as the exponent value. Thus, "$1010_{(2)}$" is set as the exponent of the floating-point number y0.

(3) 5 bits immediately following the exponent position of the fixed-point number y0 are set as the mantissa of the floating-point number y0. In the illustrated in FIG. 11, the fixed-point number y0 has values of "1", "0", "1", "1", and "1" at respective bit positions "9", "8", "7", "6", and "5". Thus, "$10111_{(2)}$" is set as the mantissa of the floating-point number y0.

The soft decision value y2 is converted into a relative floating-point number via a process described below, which is performed by the floating-point number generator 30. The soft decision value y4 is converted into a relative floating-point number via a process similar to that described below for the soft decision value y2, and thus a description thereof is omitted.

(1) The first bit of the fixed-point number y2 is set as the sign of the floating-point number y2. In the example illustrated in FIG. 11, the first bit of the fixed-point number y2 is "0", and thus "0" is set as the sign of the floating-point number y2.

(2) Relative bit positions are set for the fixed-point number y2. The relative bit positions are determined by taking the exponent position of the reference soft decision value as the reference. In the example illustrated in FIG. 11, the exponent value of the reference soft decision value y0 is "10". In this case, the relative bit positions of the soft decision value y2 are set such that the relative bit position "1" of the soft decision value y2 corresponds to the bit position "10" of the soft decision value y0. As a result, the original bit positions "15" to "10" are converted into the relative bit positions "6" to "1".

(3) The data part of the fixed-point number y2 is searched sequentially starting from the high-order bit to find a first change in value. A relative bit position number indicating the bit position at which the first change in value occurs is set as the exponent of the floating-point number y2. Hereinafter, the bit position identified in the above-described manner will also be referred to as a relative exponent position, and a number assigned to indicate the bit position corresponding to the relative exponent position will also be referred to as an exponent value. In the example illustrated in FIG. 11, "0" appears successively at relative bit positions "6" to "3" of the fixed-point number y2, and "1" appears for the first time at a relative bit position "2". Note that in FIG. 11, the relative exponent position is denoted by being enclosed by an open circle. In this case, "2" is obtained as the relative exponent value of the soft decision value y2. Thus, "$10_{(2)}$" is set as the exponent of the floating-point number.

(4) 5 bits immediately following the relative exponent position of the fixed-point number y2 are set as the mantissa of the floating-point number y2. In the example illustrated in FIG. 11, in the fixed-point number y2, 5 successive bits immediately following the relative bit position "2" are "0", "1", "1", "0", and "1". Thus, "$01101_{(2)}$" is set as the mantissa of the floating-point number y2.

In the method illustrated in FIG. 11, the relative floating-point number is generated directly from the fixed-point number representing the soft decision value. On the other hand, in a method illustrated in FIG. 12, a fixed-point number is first converted into a floating-point number, and then the exponent of the floating-point number is converted into a relative value.

Figure 12:
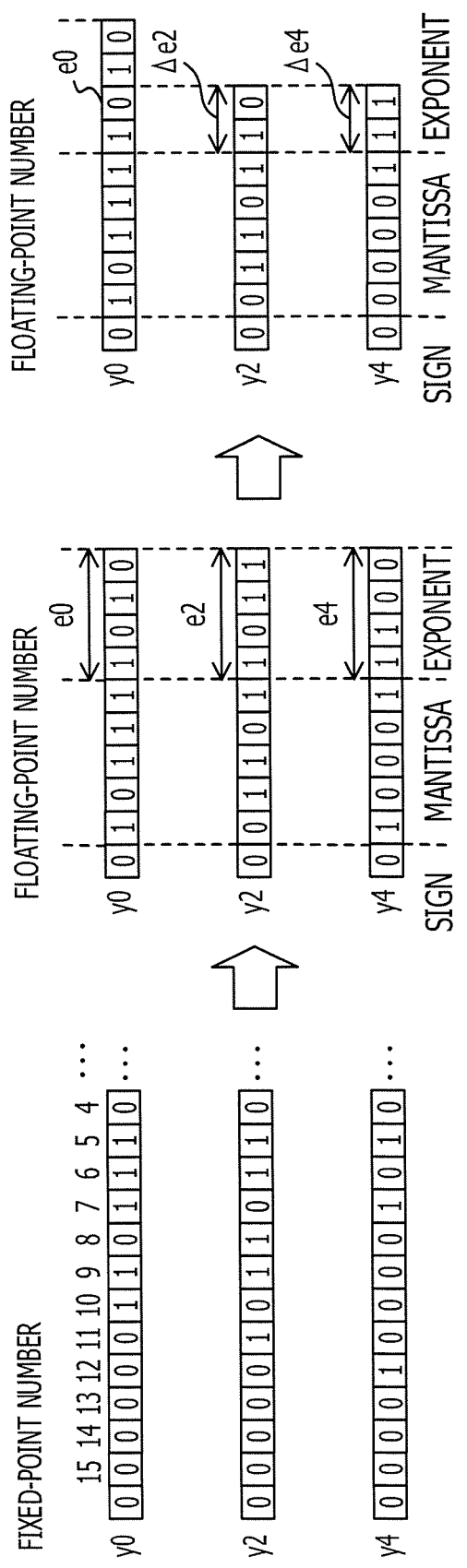
FIG. 12 is a diagram illustrating another method of processing soft decision value according to an embodiment.

In FIG. 12, the exponent position of the fixed-point number y2 is "11", and thus the exponent value e2 of the floating-point number y2 is "$1011_{(2)}$". On the other hand, the exponent position of the fixed-point number y4 is "12" and thus the exponent value e4 of the floating-point number y4 is "$1100_{(2)}$". Therefore, by calculating $\Delta e2=e2-e0+1$, the relative value of the exponent value of the soft decision value y2 is obtained as "$10_{(2)}$". Similarly, by calculating $\Delta e4=e4-e0+1$, the relative value of the exponent value of the soft decision value y4 is obtained as "$11_{(2)}$".

In the example illustrated in FIG. 11, the relative bit positions are specified such that the exponent position of the reference soft decision value corresponds to the relative bit position "1" of the soft decision value. Therefore, when an exponent value of a floating-point number representing soft decision value is converted into a relative value, "1" is added to the difference between an exponent value of reference soft decision value and an exponent value of relative soft decision value.

As described above, either one of the methods illustrated in FIG. 11 and FIG. 12 allows it to obtain the same floating-point number. In other words, the method illustrated in FIG. 11 is equivalent to the method illustrated in FIG. 12.

Figure 13:
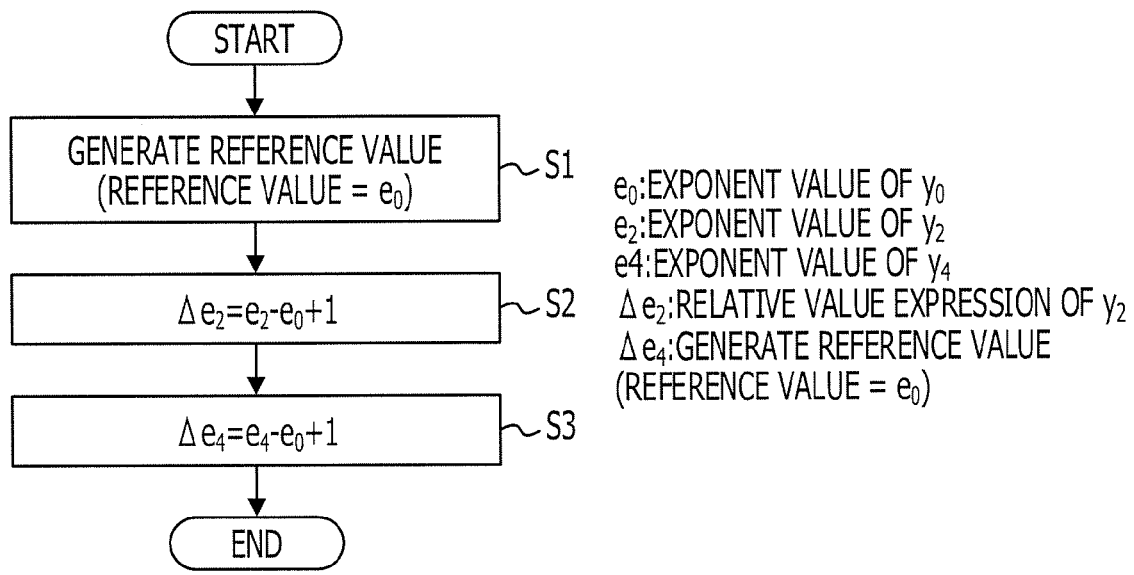
FIG. 13 is a flow chart illustrating a process according to an embodiment.

FIG. 13 is a flow chart illustrating an operation according to the first embodiment. Referring to the flow chart illustrated in FIG. 13, an explanation is given below as to a process of converting an exponent value of a floating-point number representing soft decision value into a relative value.

In S1, the reference value generator 31 determines a reference value based on reference soft decision value. In the present example, the reference value is determined based on the soft decision value y0. That is, the exponent value e0 of the floating-point number representing the soft decision value y0 is used as the reference value.

In S2, the relative value generator 32 converts the exponent value of the floating-point number representing the soft decision value y2 into a relative value. In this process, $\Delta e2=e2-e0+1$ is calculated. In S3, the relative value generator 32 converts the exponent value of the floating-point number representing the soft decision value y4 into a relative value. In this process, $\Delta e4=e4-e0+1$ is calculated.

Second Embodiment

FIG. 14 illustrates a method of processing soft decision value according to a second embodiment. The processing on soft decision value according to the second embodiment may be performed, for example, by the receiver 20B illustrated in FIG. 8.

In the second embodiment, the exponent value of relative soft decision value is smaller than the exponent value of reference soft decision value. In the example illustrated in FIG. 14, the exponent value of the soft decision value y0 is "10", and the exponent value of the soft decision value y2 is "9".

In this case, the soft decision value y2 is converted into a relative floating-point number as described below. The soft decision value y0 is converted into a floating-point number via a process similar to that according to the first embodiment described above, and thus a description thereof is omitted. The soft decision value y4 is converted into a relative floating-point number via a process similar to that described below for the soft decision value y2, and thus a description thereof is also omitted.

(1) The first bit of the fixed-point number y2 is set as the sign of the floating-point number y2. In the example illustrated in FIG. 14, the first bit of the fixed-point number y2 is "0", and thus "0" is set as the sign of the floating-point number y2.

(2) As in the first embodiment, relative bit positions are set for the fixed-point number y2. That is, the relative bit positions of the soft decision value y2 are set such that the relative bit position "1" of the soft decision value y2 corresponds to the exponent position (the bit position "10" in the example illustrated in FIG. 14) of the reference soft decision value y0. As a result, the original bit positions "15" to "10" are converted into the relative bit positions "6" to "1". Furthermore, a relative bit position "0" is given to respective bits located following the original bit position "10".

(3) The data part of the fixed-point number y2 is searched sequentially starting from the high-order bit to find a first change in value. A relative bit position number indicating the bit position at which the first change in value occurs is set as the exponent of the floating-point number y2. Note that the original exponent value of the soft decision value y2 is "9", which is smaller than the exponent value "10" of the reference soft decision value y0. Therefore, "0" is given to all values at relative bit positions "6" to "1" of the fixed-point number y2. In this case, as a result of the search, "0" is output as the relative exponent value to the soft decision value y2. Thus, "$00_{(2)}$" is set as the exponent of the floating-point number y2.

(4) 5 bits immediately following the relative exponent position of the fixed-point number y2 are set as the mantissa of the floating-point number y2. The relative bit positions are determined by taking the exponent position of the reference soft decision value as the reference. That is, in the fixed-point number y2, the relative exponent position corresponds to the relative bit position "1". Thus, 5 bits located immediately following the relative bit position "1" of the fixed-point number y2 are set as the mantissa of the floating-point number y2. In the example illustrated in FIG. 14, 5 bits located immediately following the relative bit position "1" of the fixed-point number y2 are "1", "1", "0", "1", and "0". Thus, "$11010_{(2)}$" is set as the mantissa of the floating-point number y2.

FIG. 15 is a flow chart illustrating a process according to the second embodiment. Referring to the flow chart illustrated in FIG. 15, an explanation is given below as to a process converting an exponent value of a floating-point number representing soft decision value into a relative value, and determining a mantissa. Here it is assumed that the exponent e0 of the soft decision value y0 has been specified as the reference value used in converting the exponent of the floating-point number into a relative value.

In S11, the relative value generator 32 compares the exponent value e0 of the reference soft decision value y0 with the exponent value e2 of the soft decision value y2. If the exponent value e2 is equal to or greater than the exponent value e0, the flow of the process of the relative value generator 32 proceeds to S12. However, if the exponent value e2 is smaller than the exponent value e0, the flow of the process of the relative value generator 32 proceeds to S14.

In the case where the exponent value e2 is equal to or greater than the exponent value e0, then, in S12, the relative value generator 32 converts the exponent value e2 into a relative value Δe2 based on the reference value e0. More specifically, the relative value generator 32 calculates Δe2=e2−e0+1. In S13, the relative value generator 32 sets the mantissa of the floating-point number y2. More specifically, the relative value generator 32 extracts 5 bits at positions immediately following the exponent position e2 from the fixed-point number y2, and sets the 5 bits extracted from the fixed-point number y2 as the mantissa of the floating-point number y2.

In the case where the exponent value e2 is smaller than the exponent value e0, then, in S14, the relative value generator 32 sets "0" as the exponent of the floating-point number y2. In S15, the relative value generator 32 sets the mantissa of the floating-point number y2. More specifically, in S15, the relative value generator 32 extracts 5 bits at positions immediately following the relative exponent position e0 from the fixed-point number y2, and sets the 5 bits extracted from the fixed-point number y2 as the mantissa of the floating-point number y2.

The process from S16 to S20 performed on the soft decision value y4 is substantially similar to the process from S11 to S15, and thus a description thereof is omitted.

Third Embodiment

In the first and second embodiments described above, exponents of a plurality of floating-point numbers are converted into relative values based on one reference value. In contrast, in a third embodiment, exponents of floating-point numbers are converted into relative values based on different reference values selected for respective pieces of soft decision value. For example, soft decision value y2 is converted into a relative value with respect to soft decision value y0, and soft decision value y4 is converted into a relative value with respect to soft decision value y2.

Figure 16:
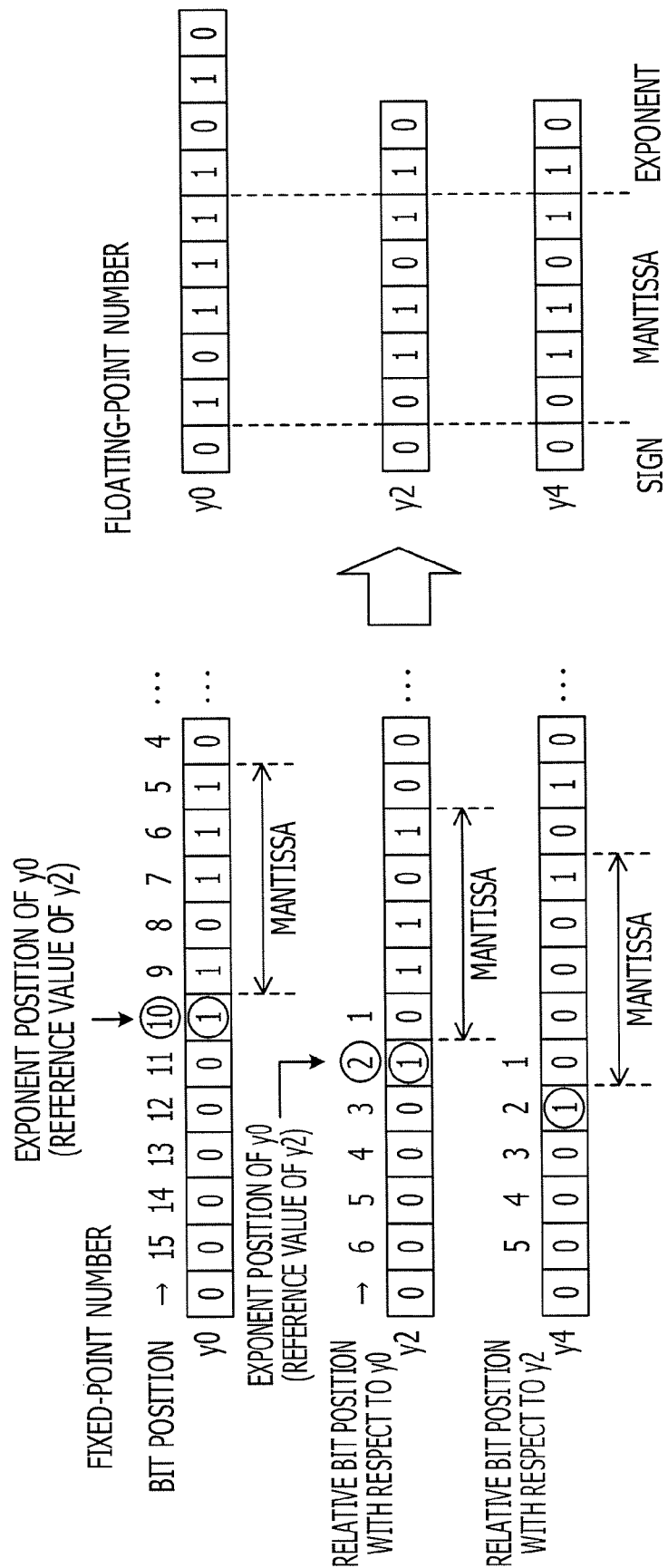
FIG. 16 is a diagram illustrating a method of processing soft decision value according to an embodiment.

FIG. 16 is a diagram illustrating a method of data processing on soft decision according to the third embodiment. The processing on soft decision value according to the third embodiment may be performed, for example, by the receiver 20B illustrated in FIG. 8.

The soft decision value y2 is converted into a relative floating-point number as described below. The soft decision value y0 is converted into a floating-point number via a process similar to that according to the first embodiment described above, and thus a description thereof is omitted.

(1) The first bit of the fixed-point number y2 is set as the sign of the floating-point number y2. In the example illustrated in FIG. 16, the first bit of the fixed-point number y2 is "0", and thus "0" is set as the sign of the floating-point number y2.

(2) Relative bit positions are set for the fixed-point number y2. The relative bit positions are determined by taking the exponent position of the reference soft decision value as the reference. In the example illustrated in FIG. 16, the exponent value of the reference soft decision value y0 is "10". In this case, the relative bit positions of the soft decision value y2 are set such that the relative bit position "1" of the soft decision value y2 corresponds to the original bit position "10". Thus, the original bit positions "15" to "10" are converted into the relative bit positions "6" to "1".

(3) The data part of the fixed-point number y2 is searched sequentially starting from the high-order bit to find a first change in value. A relative bit position number indicating the bit position at which the first change in value occurs is set as the exponent of the floating-point number y2. In the example illustrated in FIG. 16, "1" appears for the first time at a relative bit position "2" of the fixed-point number y2. In this case, "2" is obtained as the relative exponent value of the soft decision value y2. Thus, "$10_{(2)}$" is set as the exponent of the floating-point number y2.

(4) 5 bits at positions immediately following the relative exponent position of the fixed-point number y2 are set as the mantissa of the floating-point number y2. In the example illustrated in FIG. 16, 5 bits immediately following the relative bit position "2" of the fixed-point number y2 are "0", "1", "1", "0", and "1". Thus, "01101$_{(2)}$" is set as the mantissa of the floating-point number y2.

Next, the soft decision value y4 is represented by a relative value with respect to not the soft decision value y0 but the soft decision value y2. That is, the soft decision value y4 is converted into a relative floating-point number as described below.

(1) The first bit of the fixed-point number y4 is set as the sign of the floating-point number y4. In the example illustrated in FIG. 16, the first bit of the fixed-point number y4 is "0", and thus "0" is set as the sign of the floating-point number y4.

(2) Relative bit positions are set for the fixed-point number y4. Note that the reference soft decision value for the soft decision value y4 is not the soft decision value y0 but the soft decision value y2. Therefore, the relative bit positions of the soft decision value y4 are determined by taking the exponent position of the soft decision value y2 as the reference. In the example illustrated in FIG. 16, the exponent value of the soft decision value y2 corresponds to the original bit position "11". In this case, the relative bit positions of the soft decision value y4 are set such that the relative bit position "1" of the soft decision value y4 corresponds to the original bit position "11". As a result, the original bit positions "15" to "11" are converted into the relative bit positions "5" to "1".

(3) The data part of the fixed-point number y4 is searched sequentially starting from the high-order bit to find a first change in value. A relative bit position number indicating the bit position at which the first change in value occurs is set as the exponent of the floating-point number y4. In the example illustrated in FIG. 16, "1" appears for the first time at a relative bit position "2" of the fixed-point number y4. In this case, "2" is obtained as the relative exponent value of the soft decision value y4. Thus, "10$_{(2)}$" is set as the exponent of the floating-point number y4.

(4) 5 bits at positions immediately following the relative exponent position of the fixed-point number y4 are set as the mantissa of the floating-point number y4. In the example illustrated in FIG. 16, 5 bits located immediately following the relative bit position "2" of the fixed-point number y4 are "0", "0", "0", "0", and "1". Thus, "00001$_{(2)}$" is set as the mantissa of the floating-point number y4.

Figure 17:
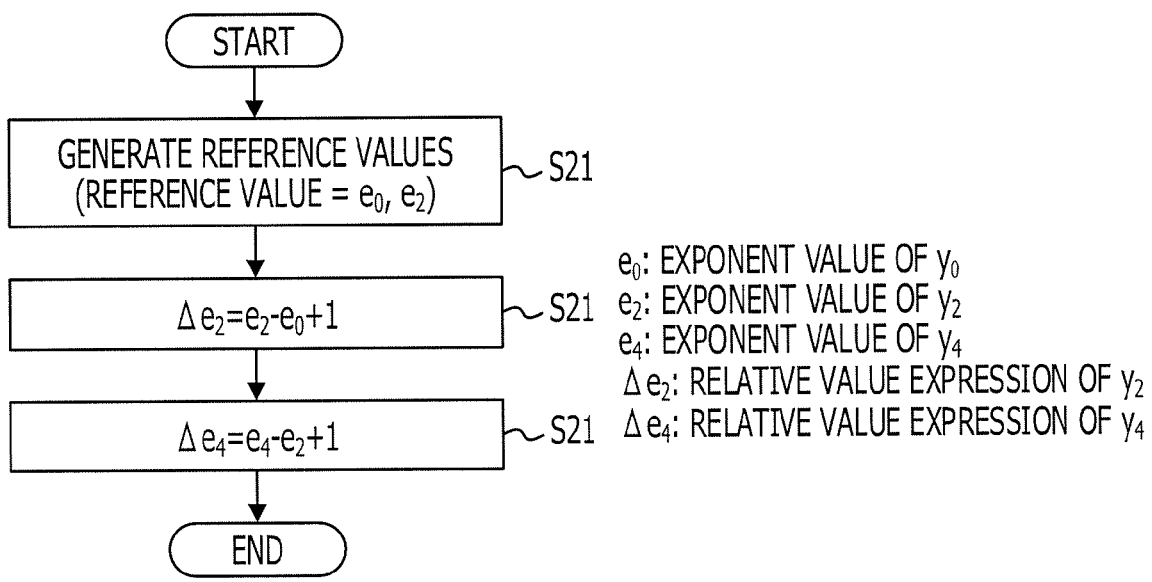
FIG. 17 is a flow chart illustrating a process according to an embodiment.

FIG. 17 is a flow chart illustrating a process according to the third embodiment. Referring to this flow chart illustrated in FIG. 17, an explanation is given below as to a process of converting an exponent value of a floating-point number representing soft decision value into a relative value.

In S21, the reference value generator 31 determines a reference value. More specifically, the reference value generator 31 generates a reference value for each piece of soft decision value. In the present example, the exponent value e0 of the soft decision value y0 is output as the reference value used to represent the soft decision value y2 by a relative value, and the exponent value e2 of the soft decision value y2 is output as the reference value used to represent the soft decision value y4 by a relative value.

In S22, the relative value generator 32 converts the exponent value of the floating-point number representing the soft decision value y2 into a relative value. In this process, Δe2=e2−e0+1 is calculated. Similarly, in S23, the relative value generator 32 converts the exponent value of the floating-point number representing the soft decision value y4 into a relative value. In this process, Δe4=e4 −e2+1 is calculated.

Fourth Embodiment

In the first to third embodiments described above, within a plurality of pieces of soft decision value generated from one received symbol, one piece of soft decision value is selected as reference soft decision value and relative values of the other pieces of soft decision value are generated with respect to the reference soft decision value. In contrast, in a fourth embodiment, a reference value is generated based on soft decision value of a past received symbol, and a relative value of soft decision value of a current received symbol is generated with respect to the reference value. For example, a current reference value for a current received symbol is determined such that a difference between the current reference value and a reference value generated for an immediately previous received symbol is equal to or smaller than a predetermined value. Soft decision value of the current received symbol is then converted into a relative value based on the current reference value.

Figure 18:
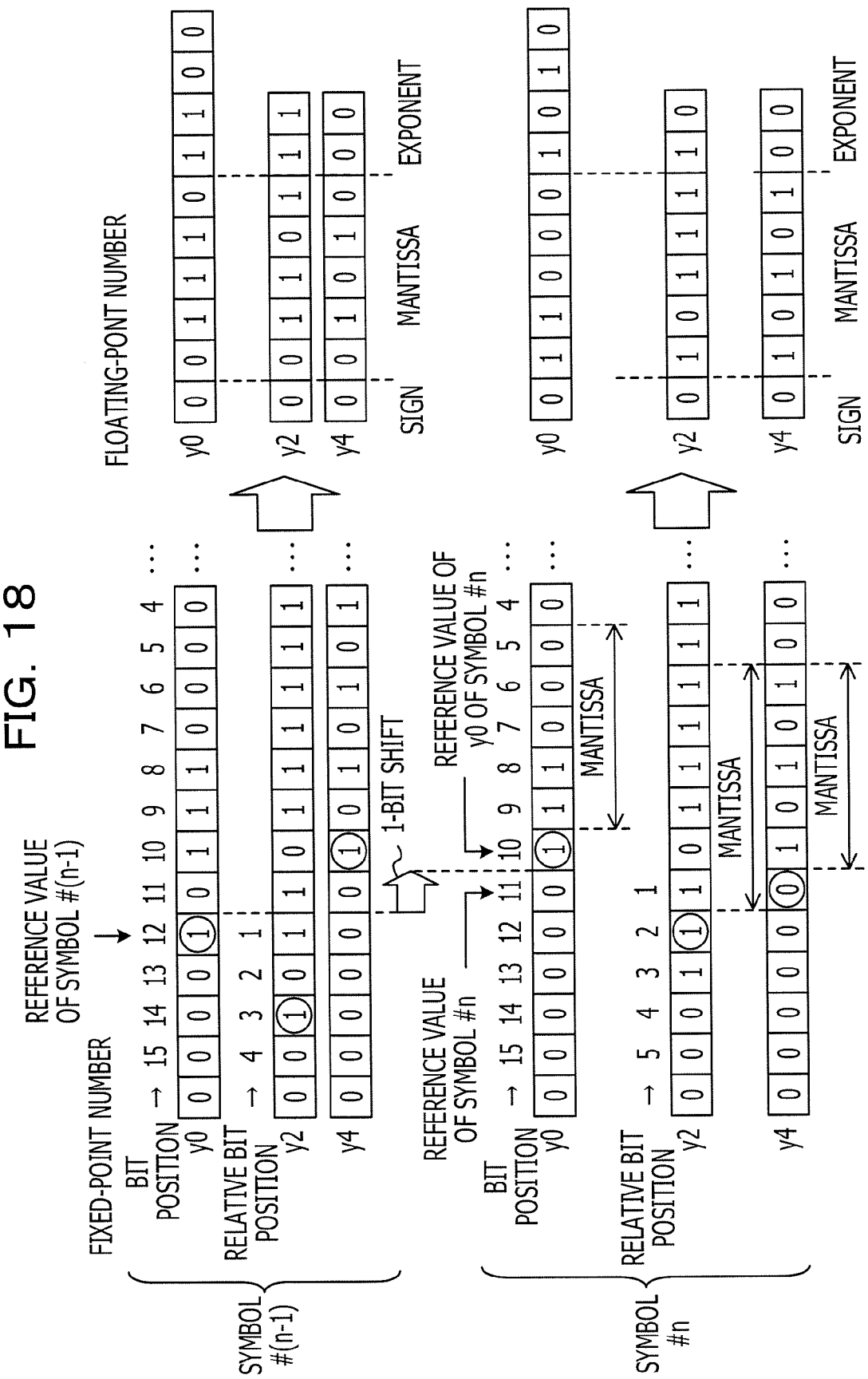
FIG. 18 is a diagram illustrating a method of processing soft decision value according to an embodiment.

FIG. 18 is a diagram illustrating a method of data processing on soft decision according to the fourth embodiment. The processing on soft decision value according to the fourth embodiment may be performed, for example, by the receiver 20B illustrated in FIG. 8.

FIG. 18 illustrates soft decision value y0, y2, and y4 for the (n−1)th and nth received symbols. Note that the (n−1)th received symbol is a received symbol immediately prior to the nth received symbol. Hereinafter, the (n−1)th and nth received symbols will also be referred to as a received symbol #(n−1), and a received symbol #n, respectively.

In the present embodiment, it is assumed by way of example that, for the received symbol #(n−1), soft decision value y2 and y4 have been converted into relative floating-point numbers based on a reference value "12". Note that exponents of soft decision value of received symbols are converted into relative values based on a given reference value using a method similar to that used in the first or second embodiment, and thus a further description of the method is omitted.

The reference value generator 31 generates a reference value for use in processing the received symbol #n based on the reference value used in processing the received symbol #(n−1). For example, the reference value generator 31 determines the reference value for use in processing the current received symbol as follows.

(1) In a case where an exponent value of soft decision value y0 of the received symbol #n is greater than a reference value of the received symbol #(n−1), "1" is added to the reference value of the received symbol #(n−1) and a result is employed as the reference value for the received symbol #n ($E_n=E_{n-1}+1$)

(2) In a case where the exponent value of the soft decision value y0 of the received symbol #n is smaller than the reference value of the received symbol #(n−1), "1" is subtracted from the reference value of the received symbol #(n−1), and a result value is employed as the reference value of the received symbol #n ($E_n=E_{n-1}-1$).

(3) In a case where the exponent value of the soft decision value y0 of the received symbol #n is equal to the reference value of the received symbol #(n−1), the reference value of the received symbol #n is set to be equal to the reference value of the received symbol #(n−1) ($E_n=E_{n-1}$). Subsequently, the floating-point number generator 30 converts respective fixed-point numbers y0, y2, and y4 representing soft decision value of the received symbol #n into floating-point numbers y0, y2, and y4. The process of converting the fixed-point number y0 into the floating-point number y0 is performed in a similar manner to that according to the first embodiment, and a further description thereof is omitted.

The soft decision value y2 of the received symbol #n is converted into the floating-point number as described below. Note that the soft decision value y4 of the received symbol #n is converted into the floating-point number in a substantially similar manner to that for the soft decision value y2, and thus a description thereof is omitted.

(1) The first bit of the fixed-point number y2 of the received symbol #n is set as the sign of the floating-point number y2. In the example illustrated in FIG. 18, the first bit of the fixed-point number y2 is "0", and thus "0" is set as the sign of the floating-point number y2.

(2) Relative bit positions are set for the fixed-point number y2 of the received symbol #n. In this specific state, the reference value of the received symbol #(n−1) is "12", and the exponent value of the soft decision value y0 of the received symbol #n is "10". That is, the exponent value of the soft decision value y0 of the received symbol #n is smaller than the reference value of the received symbol #(n−1). In this case, the reference value of the received symbol #n is set to be equal to a value obtained by subtracting "1" from the reference value of the received symbol #(n−1). Thus, "11" is obtained as the reference value of the received symbol #n, and relative bit positions of the soft decision value y2 of the received symbol #n are determined based on this reference value "11" of the received symbol #n. That is, the relative bit positions of the soft decision value y2 are set such that the relative bit position "1" of the soft decision value y2 corresponds to the original bit position "11". As a result, the original bit positions "15" to "11" are converted into the relative bit positions "5" to "1".

(3) The data part of the fixed-point number y2 of the received symbol #n is searched sequentially starting from the high-order bit to find a first change in value. A relative bit position number indicating the bit position at which the first change in value occurs is set as the exponent of the floating-point number y2. In the example illustrated in FIG. 18, "1" appears for the first time at a relative bit position "2" of the fixed-point number y2. In this case, "2" is obtained as the relative exponent value of the soft decision value y2. Thus, "$10_{(2)}$" is set as the exponent of the floating-point number y2.

(4) 5 bits at positions immediately following the relative exponent position of the fixed-point number y2 of the received symbol #n are set as the mantissa of the floating-point number y2. In the example illustrated in FIG. 18, 5 bits located immediately following the relative bit position "2" of the fixed-point number y2 of the fixed-point number y2 are "1", "0", "1", "1", and "1". Thus, "$10111_{(2)}$" is set as the mantissa of the floating-point number y2.

Figure 19:
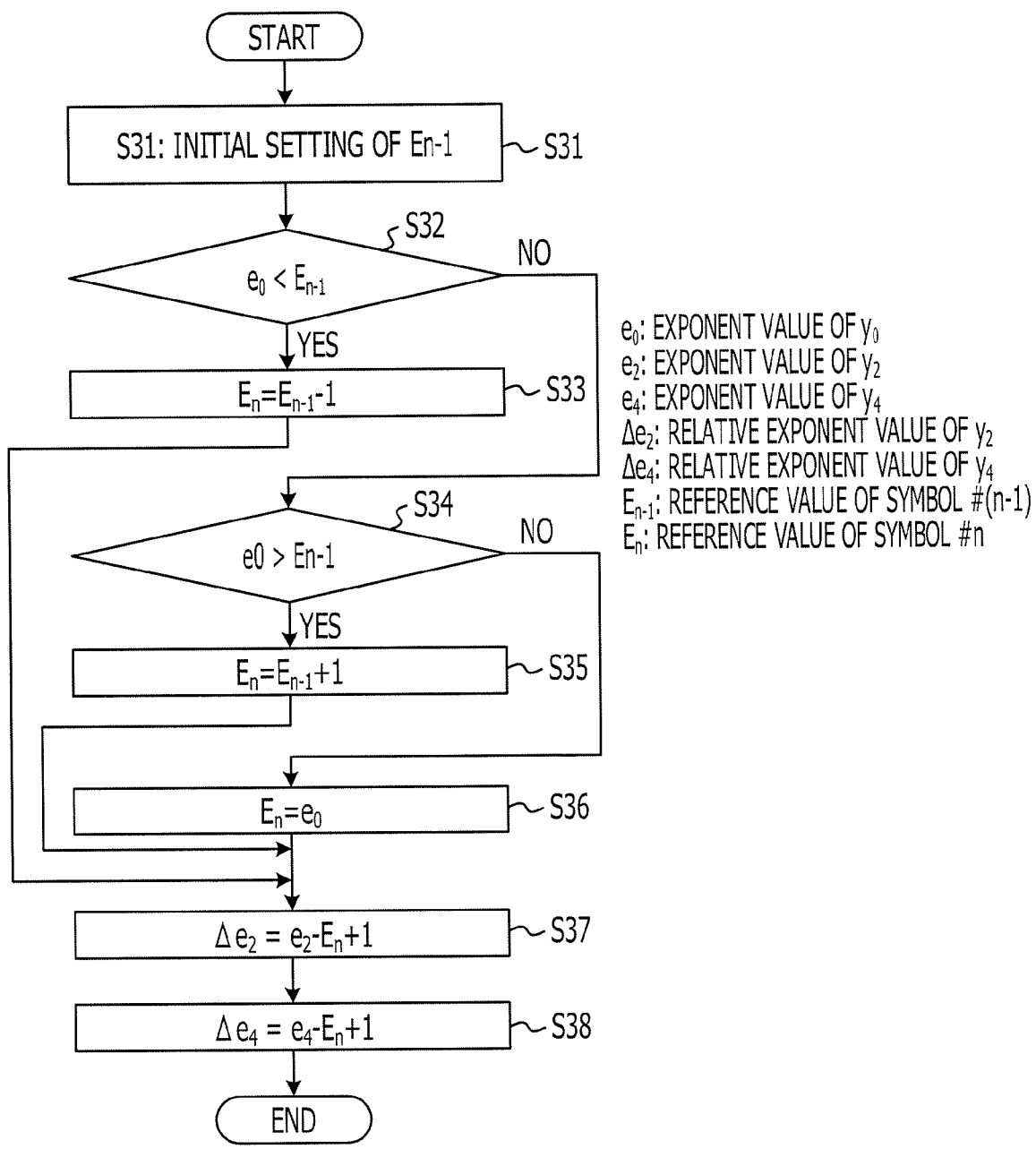
FIG. 19 is a flow chart illustrating a process according to an embodiment.

FIG. 19 is a flow chart illustrating a process according to the fourth embodiment. Referring to this flow chart illustrated in FIG. 19, a process on the received symbol #n is described below.

In S31, the reference value generator 31 acquires the reference value $E_{n-1}$ used for the received symbol #(n−1). Note that it is assumed here that the reference value $E_{n-1}$ of the received symbol #(n−1) has already been calculated by performing the process on the received symbol #(n−1) according to the flow chart illustrated in FIG. 19.

In S32, the reference value generator 31 determines whether the exponent value e0 of the soft decision value y0 of the received symbol #n is smaller than the reference value $E_{n-1}$ of the received symbol #(n−1). If the exponent value e0 is smaller than the reference value $E_{n-1}$, then, in S33, the reference value generator 31 subtracts 1 from the reference value $E_{n-1}$ and employs a resultant value as the reference value $E_n$ of the received symbol #n.

On the other hand, if the determination in S32 is negative (the answer to S32 is "No"), then, in S34, the reference value generator 31 determines whether the exponent value e0 of the soft decision value y0 of the received symbol #n is greater than the reference value $E_{n-1}$ of the received symbol #(n−1). If the exponent value e0 is greater than the reference value $E_{n-1}$, then, in S35, the reference value generator 31 adds 1 to the reference value $E_{n-1}$ and employs a resultant value as the reference value $E_n$ of the received symbol #n.

In a case where the answer is "No" to both S32 and S34, the reference value generator 31 determines that the reference value $E_{n-1}$ of the received symbol #(n−1) is equal to the exponent value e0 of the soft decision value y0 of the received symbol #n. In this case, in S36, the reference value generator 31 sets the reference value $E_n$ to be equal to the reference value $E_{n-1}$.

In S37, the relative value generator 32 converts the exponent value of the floating-point number representing the soft decision value y2 into a relative value. In this process, $\Delta e2 = e2 - E_n + 1$ is calculated. Similarly, in S38, the relative value generator 32 converts the exponent value of the floating-point number representing the soft decision value y4 into a relative value. In this process, $\Delta e4 = e4 - E_n + 1$ is calculated.

In the example described above, the reference value $E_n$ of the received symbol #n is set with respect to the reference value $E_{n-1}$ of the received symbol #(n−1) such that $E_{n-1} - 1 \leq E_n \leq E_{n-1} + 1$. Note that the reference value $E_n$ of the received symbol #n is not limited to the range described above, but the reference value $E_n$ may be in a range of 2 or more around the reference value $E_{n-1}$.

Fifth Embodiment

In the first to third embodiments described above, within a plurality pieces of soft decision value generated from one received symbol, one piece of soft decision value is selected as reference soft decision value and relative values of the other pieces of soft decision value are generated with respect to the reference soft decision value. In contrast, in a fifth embodiment, a reference value is generated based on soft decision value of a plurality of received symbols, and a relative value of soft decision value of each received symbol is generated with respect to the reference value. The processing on soft decision value according to the fifth embodiment may be performed, for example, by the receiver 20B illustrated in FIG. 8.

In the method of data processing on soft decision according to the fifth embodiment, a common minimum reference value is set for a plurality of received symbols. For example, a common minimum reference value is set for a sub-block which is an execution unit in a decoding process performed by the decoder 23. There is no particular restriction on the sub-block. For example, the sub-block may include about 1000 symbols.

FIG. 20 illustrates a method of setting the minimum reference value. In the example illustrated in FIG. 20, the minimum value of reference values for use in representing soft decision value by relative values is determined using first ten received symbols R0 to R9 in the sub-block.

FIG. 20 illustrates soft decision value y0 of the received symbols R0 to R9. Exponent values of soft decision value y0 of respective received symbols R0, R1, R2, and so on are 9, 13, 11, and so on. First, the reference value generator 31 detects a maximum value of exponent values of soft decision value y0 of the received symbols R0 to R9. As a result, in the example illustrated in FIG. 20, 13 is detected as the maximum exponent value.

The reference value generator 31 then subtracts a predetermined integer a from the maximum exponent value detected in the above-described manner and employs a resultant value as the minimum reference value. In the present example, α=3. Thus, the reference value generator 31 outputs "10" as the minimum reference value. This minimum reference value is used in common for the received symbols in the sub-block.

Figure 21:
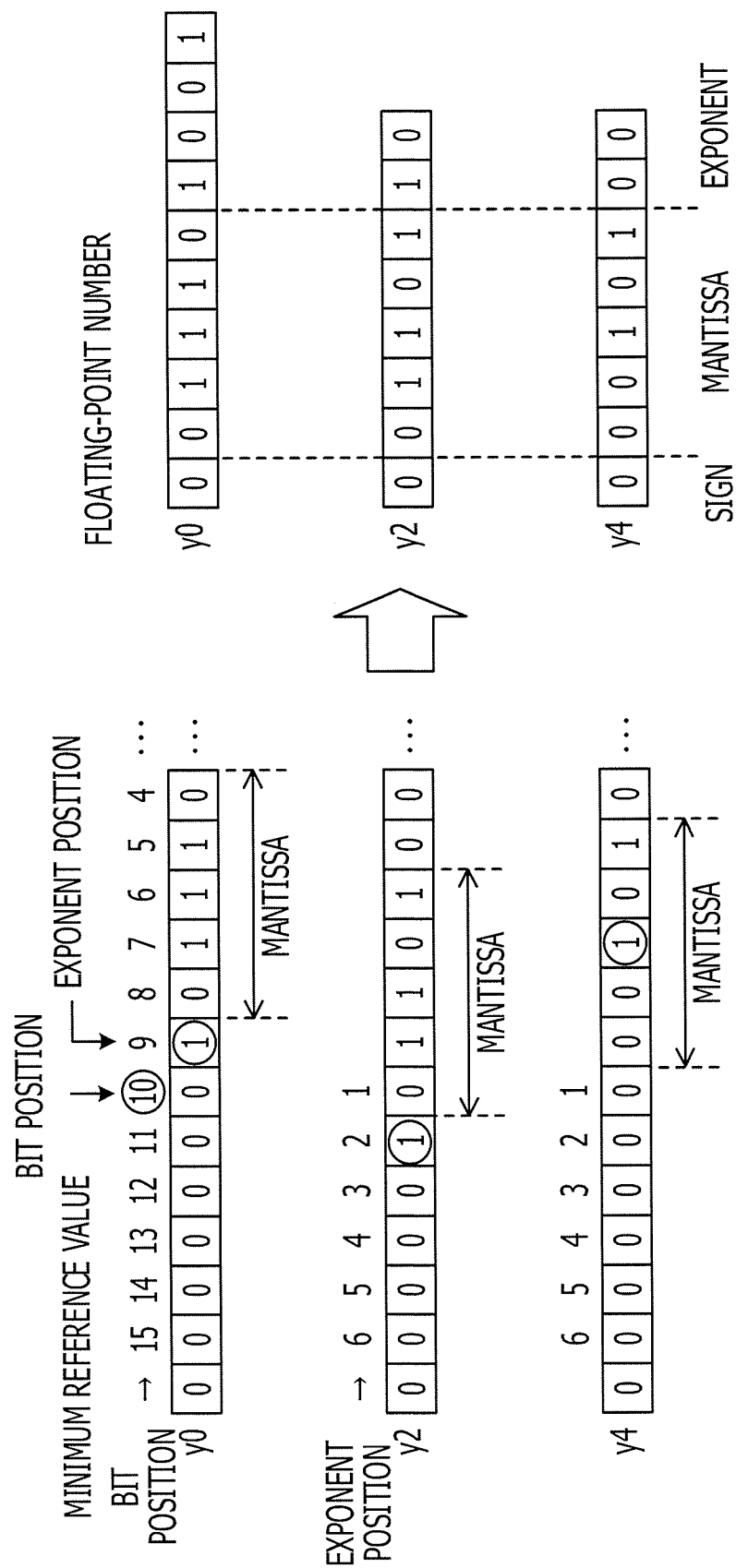
FIG. 21 is a diagram illustrating a method of processing soft decision value according to an embodiment.

FIG. 21 illustrates a method of data processing on soft decision according to the fifth embodiment. Also in this fifth embodiment, the floating-point number generator 30 converts respective pieces of fixed-point numbers y0, y2, and y 4 representing soft decision value of the received symbols into floating-point numbers y0, y2, and y4. However, the minimum reference value is not used in the process of converting the fixed-point number y0 into the floating-point number y0. The process of converting the fixed-point number y0 into the floating-point number y0 is performed in a similar manner to that according to the first embodiment, and thus a further description thereof is omitted.

The soft decision value y2 is converted into the floating-point number as described below. Note that the soft decision value y4 is converted into a floating-point number in a substantially similar manner to that for the soft decision value y2, and thus a description thereof is omitted.

(1) The first bit of the fixed-point number y2 is set as the sign of the floating-point number y2. In the example illustrated in FIG. 21, the first bit of the fixed-point number y2 is "0", and thus "0" is set as the sign of the floating-point number y2.

(2) A new reference value E is determined based on the above-described minimum reference value and the exponent value of the reference soft decision value y0. In this state, if the exponent value of the reference soft decision value y0 is equal to or greater than the minimum reference value, the exponent value of the reference soft decision value y0 is output as a new reference value E. On the other hand, when the exponent value of the reference soft decision value y0 is smaller than the minimum reference value, the minimum reference value is output as the new reference value E. In the example illustrated in FIG. 21, the minimum reference value is "10", and the exponent value of the reference soft decision value y0 is "9". Thus, 10 is employed as the new reference value E.

(3) Relative bit positions are set for the fixed-point number y2. The relative bit positions are determined by taking the bit position corresponding to the new reference value E as the reference. In the example illustrated in FIG. 21, the new reference value is "10". In this case, the relative bit positions of the soft decision value y2 are set such that the relative bit position "1" of the soft decision value y2 corresponds to the original bit position "10". As a result, the original bit positions "15" to "10" are converted into the relative bit positions "6" to "1".

(4) The data part of the fixed-point number y2 is searched sequentially starting from the high-order bit to find a first change in value. A relative bit position number indicating the bit position at which the first change in value occurs is set as the exponent of the floating-point number y2. In the example illustrated in FIG. 21, "1" appears for the first time at a relative bit position "2" of the fixed-point number y2. In this case, "2" is obtained as the relative exponent value of the soft decision value y2. Thus, "$10_{(2)}$" is set as the exponent of the floating-point number y2.

(5) 5 bits at positions immediately following the relative exponent position of the fixed-point number y2 are set as the mantissa of the floating-point number y2. In the example illustrated in FIG. 21, 5 bits located immediately following the relative bit position "2" of the fixed-point number y2 are "0", "1", "1", "0", and "1". Thus, "$01101_{(2)}$" is set as the mantissa of the floating-point number y2.

Figure 22:
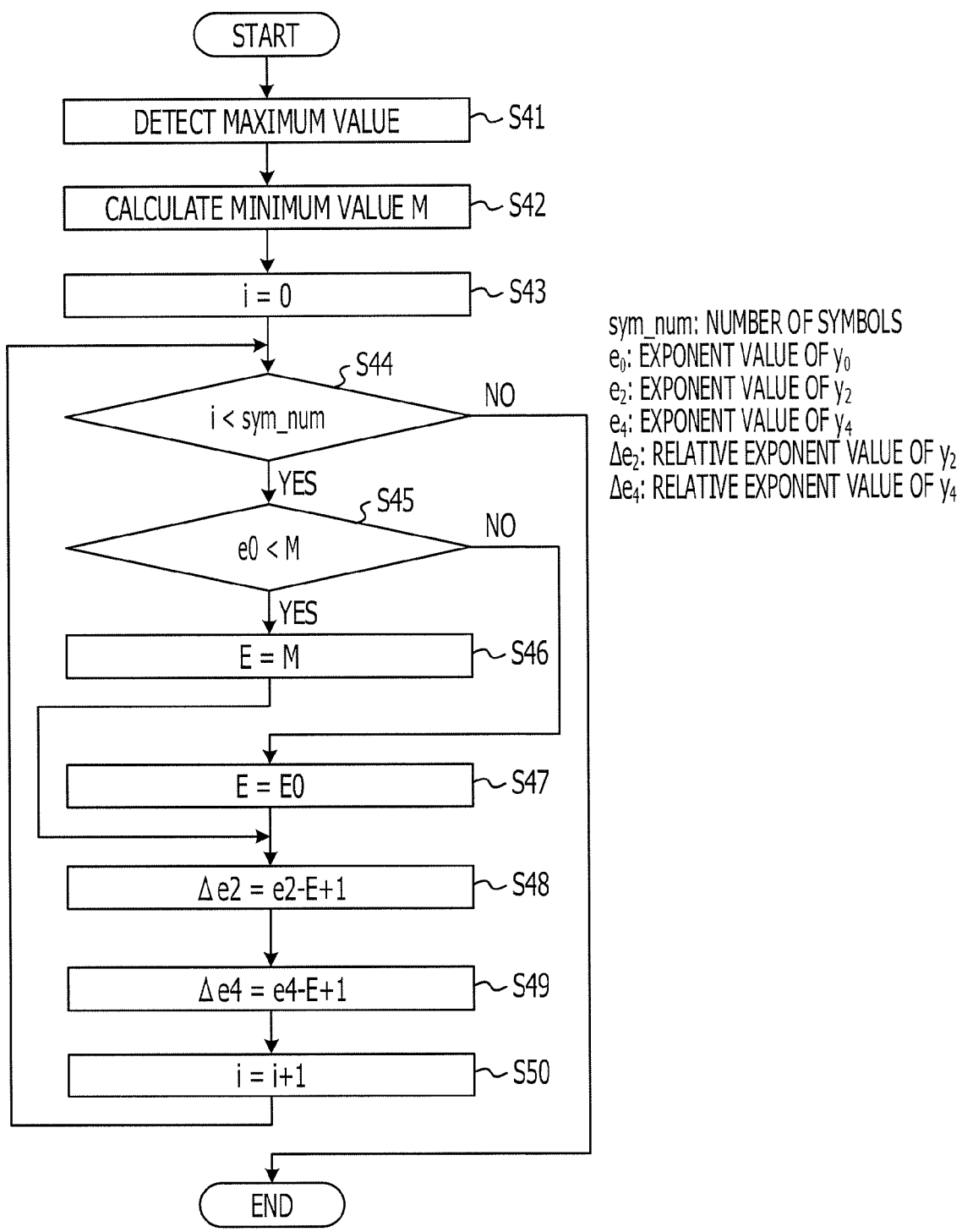
FIG. 22 is a flow chart illustrating a process according to an embodiment.

FIG. 22 is a flow chart illustrating a process according to the fifth embodiment. The process illustrated in the flow chart of FIG. 22 is performed for the sub-block including a plurality of symbols.

In S41, the reference value generator 31 detects a maximum value of exponent values of soft decision value of first ten received symbols in the sub-block. In S42, the reference value generator 31 subtracts a predetermined integer a from the maximum value detected in S41 and employs a resultant value as a minimum reference value M.

In S43, the floating-point number generator 30 initializes a variable i, which is used to count the number of received symbols. In S44, The floating-point number generator 30 determines whether the variable i is smaller than a threshold value sym_num. The threshold value sym_num represents, by way of example but not limitation, the number of symbols forming a sub-block. In a case where the variable i is smaller than the threshold value sym_num, the flow of the process performed by the floating-point number generator 30 proceeds to S45. On the other hand, in a case where the variable i is equal to or greater than the threshold value sym_num, the process of the floating-point number generator 30 is ended.

In S45, the reference value generator 31 compares the exponent value e0 of the reference soft decision value y0 with the minimum reference value M. If the exponent value e0 of the reference soft decision value y0 is smaller than the minimum reference value M, then, in S46, the reference value generator 31 outputs the minimum reference value M as the new reference value E. On the other hand, when the exponent value e0 of the reference soft decision value y0 is greater than the minimum reference value M, then, in S47, the reference value generator 31 outputs the exponent value e0 of the reference soft decision value y0 as the new reference value E.

In S48, the relative value generator 32 converts the exponent value of the floating-point number representing the soft decision value y2 into a relative value. In this process, $\Delta e2=e2-E+1$ is calculated. Similarly, in S49, the relative value generator 32 converts the exponent value of the floating-point number representing the soft decision value y4 into a relative value. In this process, $\Delta e4=e4-E+1$ is calculated.

In S50, the floating-point number generator 30 increments the variable i. Thereafter, the processing flow of the floating-point number generator 30 returns to S44. That is, the floating-point number generator 30 performs repeatedly S45 to S48 on received symbols until the number of received symbols reaches the threshold value sym_num. That is, the floating-point number generator 30 performs a process from S45 to S48 on each received symbol in the sub-block.

Sixth Embodiment

In the first to fifth embodiments described above, one of a plurality of pieces of soft decision value generated from one received symbol is specified as reference soft decision value, and the other pieces of soft decision value are represented by relative values with respect to the reference soft decision value. In contrast, in a sixth embodiment, a common reference value is given to a plurality of pieces of soft decision value generated from one received symbol, and all pieces of reference soft decision value are represented by relative values with respect to the reference value.

In the method of data processing on soft decision according to the sixth embodiment, a common reference value is set for a plurality of received symbols. For example, a common reference value is set for a sub-block which is an execution unit in the decoding process performed by the decoder 23. The processing on soft decision value according to the sixth embodiment is performed, for example, in the receiver 20C illustrated in FIG. 10.

The reference value generator 41, as with the reference value generator 31 according to the fifth embodiment, detects a maximum value of exponent values of soft decision value of first ten received symbols in the sub-block. The reference value generator 41 subtracts a predetermined integer a from the maximum value and employs a resultant value as a reference value E that is used in common for a plurality of symbols included in the sub-block.

Figure 23:
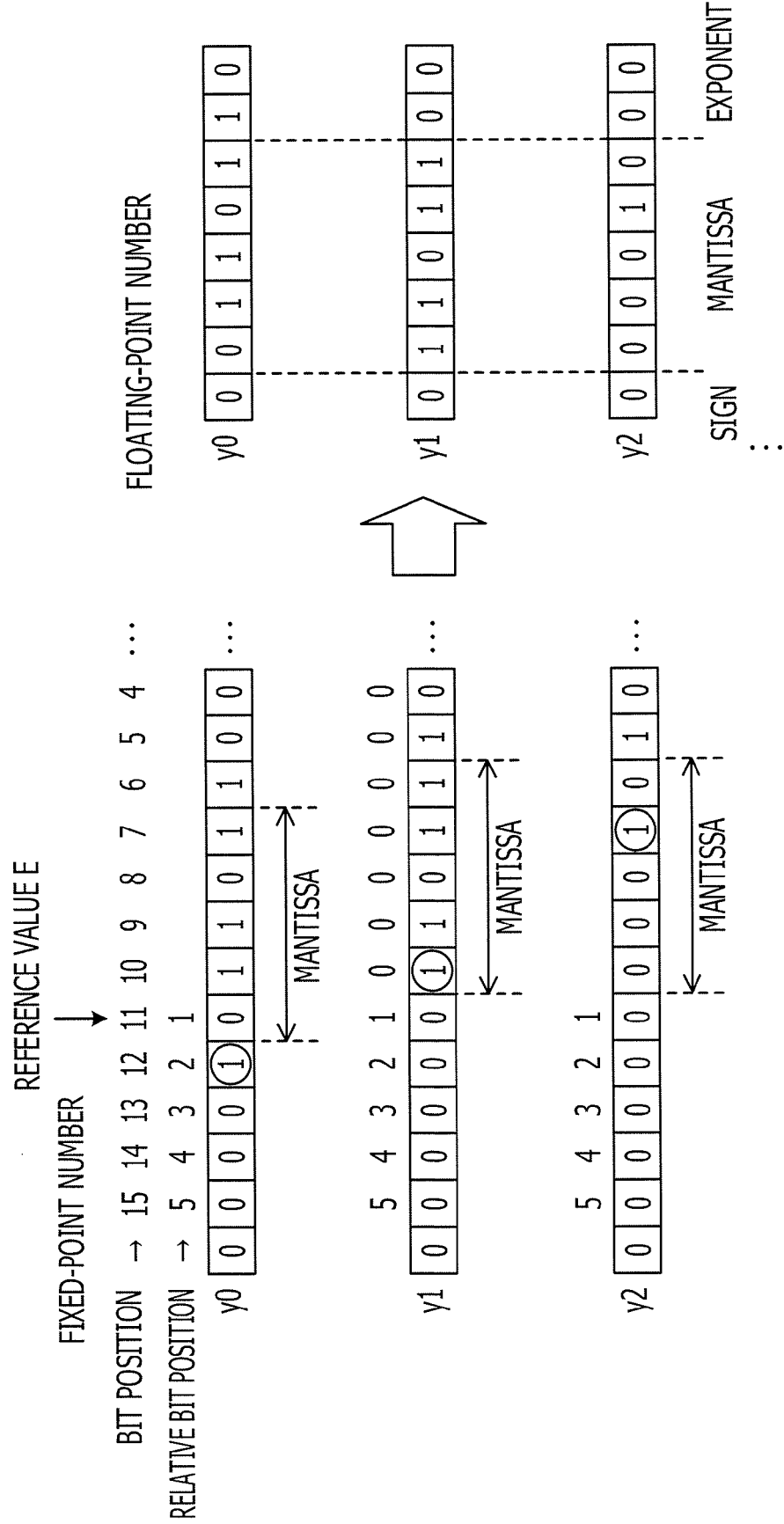
FIG. 23 is a diagram illustrating a method of processing soft decision value according to an embodiment.

FIG. 23 illustrates a method of data processing on soft decision according to the sixth embodiment. In the sixth embodiment, the floating-point number generator 40 converts respective fixed-point numbers y0, y1, y2, and so on representing soft decision value of the received symbols into floating-point numbers y0, y1, y2, and so on. In this conversion process, the floating-point number generator 40 converts each of all floating-point numbers y0, y1, y2, and so on into relative values based on the reference value.

In the present example, a maximum value of exponent values of soft decision value of first ten received symbols in the sub-block is "13", and the integer α used in obtaining the reference value E from the maximum value is "2". Thus, 11 is obtained as the reference value E. This reference value E is used to convert the respective soft decision value y0, y1, y2, and so on into relative values.

The soft decision value y0 is converted into a relative floating-point number as described below.

(1) The first bit of the fixed-point number y0 is set as the sign of the floating-point number y0. In the example illustrated in FIG. 23, the first bit of the fixed-point number y0 is "0", and thus "0" is set as the sign of the floating-point number y0.

(2) Relative bit positions are set for the fixed-point number y0. The relative bit positions are determined based on the reference value E. In the present example, the reference value E is "11". Thus, the relative bit positions are set such that the relative bit position "1" corresponds to the bit position "11" representing the reference value E. As a result, the original bit positions "15" to "11" are converted into the relative bit positions "5" to "1". Note that the relative bit positions are given in common to the fixed-point numbers y0, y1, y2, and so on.

(3) The data part of the fixed-point number y0 is searched sequentially starting from the high-order bit to find a first change in value. A relative bit position number indicating the bit position at which the first change in value occurs is set as the exponent of the floating-point number y0. In the example illustrated in FIG. 23, and "1" appears for the first time at a relative bit position "2". That is, "2" is obtained as the relative exponent value of the soft decision value y0. Thus, "$10_{(2)}$" is set as the exponent of the floating-point number y0.

(4) 5 bits at positions immediately following the relative exponent position of the fixed-point number y0 are set as the mantissa of the floating-point number y0. In the example illustrated in FIG. 23, 5 bits located immediately following the relative bit position "2" of the fixed-point number y0 are "0", "1", "1", "0", and "1". Thus, "$01101_{(2)}$" is set as the mantissa of the floating-point number y0.

The soft decision value y1 is converted into a relative floating-point number as described below.

(1) The first bit of the fixed-point number y1 is set as the sign of the floating-point number y1. In the example illustrated in FIG. 23, the first bit of the fixed-point number y1 is "0", and thus "0" is set as the sign of the floating-point number y1.

(2) Relative bit positions are set for the fixed-point number y1 as with the fixed-point number y0. Note that the relative bit positions are given in common to the soft decision value y0, y1, y2, and so on. Therefore, also for the fixed-point number y1, the original bit positions "15" to "11" are converted into the relative bit positions "5" to "1". Furthermore, a relative bit position "0" is given to respective bits following the original bit position "11".

(3) The data part of the fixed-point number y1 is searched sequentially starting from the high-order bit to find a first change in value. A relative bit position number indicating the bit position at which the first change in value occurs is set as the exponent of the floating-point number y1. In the example illustrated in FIG. 23, "1" appears for the first time at a bit position "10". That is, the exponent of the soft decision value y1 is "10". Herein, the reference value E is "11", and thus the exponent of the soft decision value y1 is smaller than the reference value E. In this case, as in the second embodiment described above with reference to FIG. 14, "0" is obtained as the relative exponent value of the soft decision value y1. Thus, "$00_{(2)}$" is set as the exponent of the floating-point number y1.

(4) In the fixed-point number y1, 5 bits immediately following the bit position corresponding to reference value E are set as the mantissa of the floating-point number y1. In the example illustrated in FIG. 20, the reference value E is "11". Therefore, 5 bits located immediately following the original bit position "11" in the fixed-point number y1 are set as the mantissa of the floating-point number y1. In the example illustrated in FIG. 23, 5 bits located following the original bit position "11" are "1", "1", "0", "1", and "1". Thus, "$11011_{(2)}$" is set as the mantissa of the floating-point number y1.

Other pieces of soft decision value are also converted into floating-point numbers in a similar manner. That is, in the sixth embodiment, all pieces of soft decision value generated from one received symbol are converted into relative values.

Figure 24:
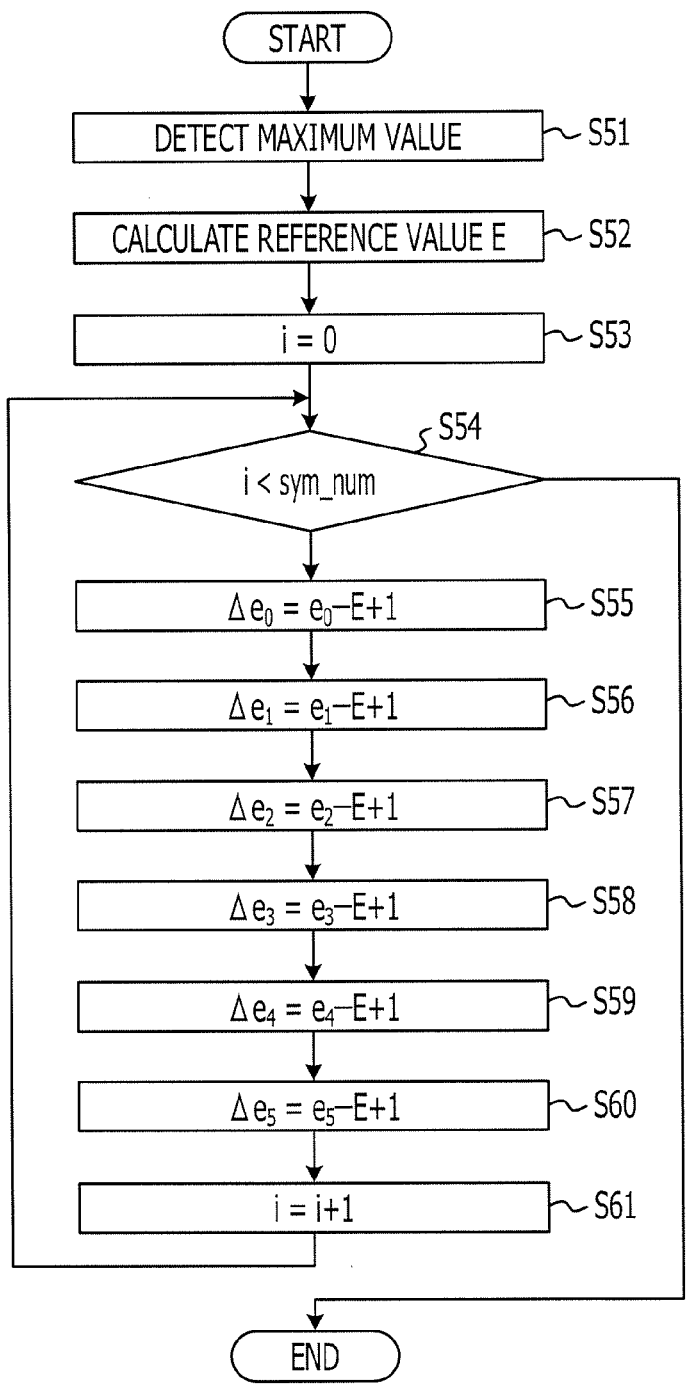
FIG. 24 is a flow chart illustrating a process according to an embodiment.

FIG. 24 is a flow chart illustrating a process according to the sixth embodiment. The process illustrated in the flow chart of FIG. 24 is performed for the sub-block including a plurality of symbols.

In S51, the reference value generator 41, detects a maximum value of exponent values of soft decision value of first ten received symbols in the sub-block. In S52, the reference value generator 41, subtracts a predetermined integer a from the maximum value detected in S41 and employs a resultant value as the reference value E.

S53 and S54 are substantially similar to S43 and S44 illustrated in FIG. 22. That is, the floating-point number generator 40 initializes a variable i, and then the floating-point number generator 40 determines whether the variable i is smaller than a threshold value sym_num. In a case where the variable i is smaller than the threshold value sym_num, the flow of the process performed by the floating-point number generator 40 proceeds to S55. On the other hand, in a case where the variable i is equal to or greater than the threshold value sym_num, the process of the floating-point number generator 40 is ended.

In S55, the relative value generator 42 converts the exponent value of the floating-point number representing the soft decision value y0 into a relative value based on the reference value E. In this process, $\Delta e0 = e0 - E + 1$ is calculated. Similarly, in S56 to S60, the relative value generator 42 converts the exponent values of the floating-point numbers representing the soft decision value y1 to y5 into relative values based on the reference value E.

In S61, the floating-point number generator 40 increments the variable i. Thereafter, the processing flow of the floating-point number generator 40 returns to S54. That is, the floating-point number generator 40 performs repeatedly S55 to S60 on received symbols until the number of received symbols reaches the threshold value sym_num. That is, the floating-point number generator 40 performs the process from S55 to S60 on each received symbol in the sub-block.

Advantageous Effects of Embodiments

In the processing on soft decision value according to any of the first to sixth embodiments, floating-point numbers representing soft decision value are converted into relative values. This allows it to reduce the size of the IF memory 22 used to store soft decision value between the demodulator 21 and the decoder 23.

This effect is discussed below for a case where each floating-point number expressing soft decision value is represented in a format including a 1-bit sign, a 5-bit mantissa, and a 4-bit exponent. In the following discussion, it is assumed that 3 pieces of soft decision value y0, y2, and y4 are generated.

In the receiver 20A illustrated in FIG. 6, the floating-point numbers y0, y2, and y4 are not converted into relative values. Therefore, the floating-point numbers y0, y2, and y4 are all 10 bits in data length.

In the receiver 20B illustrated in FIG. 8 according to one of the first to fifth embodiments, one of pieces of soft decision value y0, y2, and y4 (for example, soft decision value y0) is specified as reference soft decision value, and the other two pieces of soft decision value (for example, soft decision value y2 and y4) are represented by relative values with respect to the reference soft decision value. In this case, exponents of respective pieces of soft decision value y2 and y4 are each represented by 2 bits. That is, in contrast to the floating-point number y0 which is 10 bits in data length, each piece of the floating-point number y2 and y4 is 8 bits in data length. Therefore, compared with the receiver 20A illustrated in FIG. 6, in the receiver 20B illustrated in FIG. 8, a reduction in memory size of the IF memory 22 by 17.5% is achieved as described below.

Reduction Ratio={1−(10+8+8)/(3×10)}×100=17.5

In the case of the receiver 20C illustrated in FIG. 10 that operates according to the sixth embodiment, all pieces of soft decision value are represented by relative value with respect to a reference value, and thus each floating-point number representing of corresponding soft decision value is 8 bits in data length. Therefore, compared with the receiver 20A illustrated in FIG. 6, in the receiver 20C illustrated in FIG. 10, a reduction in memory size of the IF memory 22 by 20% is achieved as described below.

Reduction Ratio={1−8/10}×100=20

Figure 25:
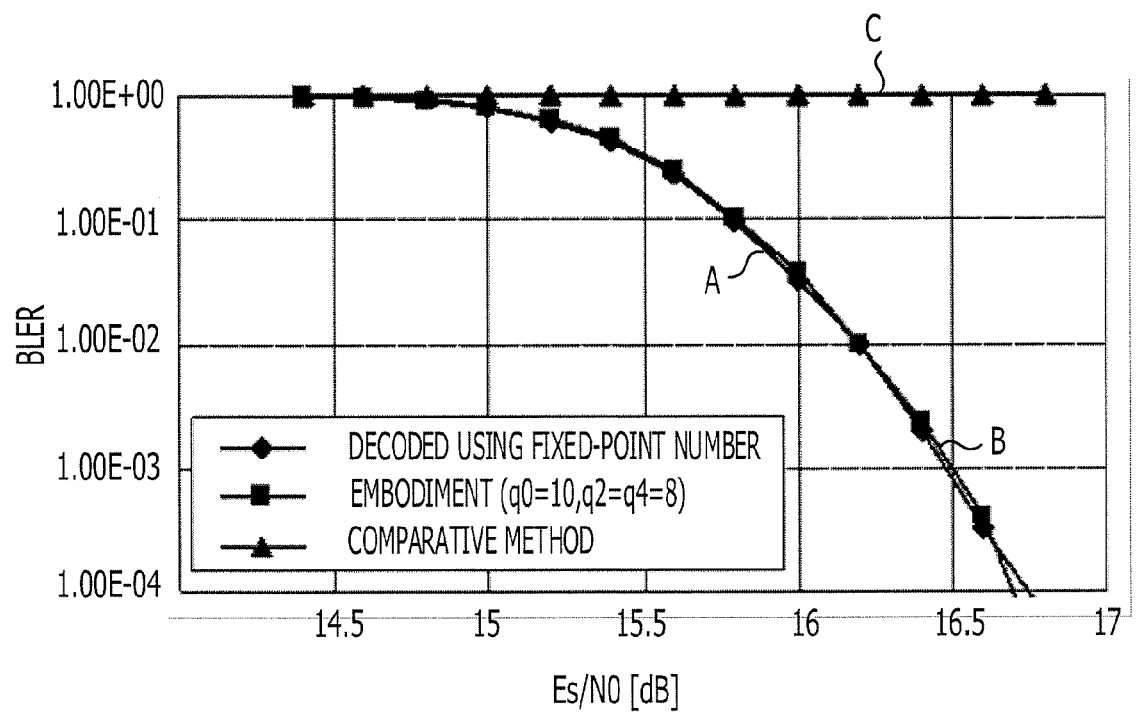
FIG. 25 is a diagram illustrating a result of simulation of an error rate.

FIG. 25 illustrates a result of simulation in terms of an error rate. Referring to FIG. 25, a Block Error Rate (BLER), which is one of performance indices, is discussed below. A horizontal axis represents a noise strength. The greater the value along the horizontal axis, the smaller the noise. A vertical axis represents an error rate. The smaller the value along the vertical axis, the smaller the error rate. In this simulation, it is assumed that 64QAM is employed as the modulation method, the number of bits of a transmission signal is 1024, and a coding ratio is 3/4.

A characteristic A illustrates BLER obtained when a conversion from a fixed-point number to a floating-point number is not performed. That is, the characteristic A indicates BLER obtained when a decoding process is performed for soft decision value represented in fixed-point numbers. In this case, no degradation occurs in performance due to a conversion from a fixed-point number into a floating-point number, and thus the characteristic A is substantially ideal.

A characteristic B illustrates BLER obtained when soft decision value is processed according to a method of one of embodiments. One of three pieces of soft decision value (more specifically, soft decision value y0) is represented by a 10-bit floating-point number illustrated in FIG. 5, and the other two pieces of soft decision value (that is, soft decision value y2 and y4) are represented by relative values with respect to the reference soft decision value. Each of the two pieces of soft decision value y2 and y4 includes a 1-bit sign, a 5-bit mantissa, and a 2-bit exponent, and the exponent of each piece of the two soft decision value y2 and y4 is represented by a relative value.

A characteristic C illustrates BLER obtained when the number of bits of an exponent of soft decision value is simply reduced without using relative expressions of values. Note that the soft decision value y0 is the same for the characteristic B and the characteristic C, and each of the soft decision value y2 and y4 includes a 1-bit sign, a 5-bit mantissa, and a 2-bit exponent. However, in the characteristic C, unlike the characteristic B, exponents of respective pieces of soft decision value y2 and y4 are each represented such that exponent positions "0" to "15" are each expressed simply by 2 bits.

The method of processing soft decision value according to one of the embodiments, a substantially ideal performance (characteristic B) is achieved. That is, the method of processing soft decision value according to one of the embodiments allows it to reduce the memory size used to store soft decision value without degradation in performance. If it is tried to reduce the memory size without using the method of processing soft decision value according to one of the embodiments, the result is degradation in performance as can be seen from the characteristic C.

Other Embodiments

In the first to fifth embodiments described above, the soft decision value (y0, y2, y4) of the I component and the soft decision value (y1, y3, y5) of the Q component are independent of each other. However, this does not limit the embodiments. For example, respective pieces of soft decision value y1 to y5 may be represented by relative values with respect to the soft decision value y0.

The method of processing soft decision value according to one of the embodiments may be applied to not only wireless communication but wire communication such as optical fiber communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiver comprising:
a memory; and
a processor coupled to the memory and configured to:
calculate a plurality of soft decision values of each of a plurality of bits mapped to a received symbol,
select a first soft decision value from the plurality of soft decision values,
calculate at least one relative value in at least one second soft decision value of the plurality of soft decision values, each of the at least one relative value being a relative value of each of the at least one second soft decision value with respect to the first soft decision value, the first soft decision value being a soft decision value of a first bit in the plurality of bits, each of the at least one second soft decision value being a soft decision value of each of at least one second bit in the plurality of bits, the first bit and each of the at least one second bit being different bits in the plurality of bits mapped to the received symbol, store the first soft decision value and the at least one relative value in the memory, and estimate the plurality of bits based on the first soft decision value and the at least one relative value which are stored in the memory.

2. The receiver according to claim 1, wherein the processor is further configured to:
convert the first soft decision value to at least one first floating-point number,
convert the at least one second soft decision value to at least one second floating-point number, and
calculate the at least one relative value based on the at least one first floating-point number and the at least one second floating-point number.

3. The receiver according to claim 2, wherein:
the at least one relative value includes at least one relative exponent of at least one second exponent to at least one second exponent,
the at least one second exponent is at least one exponent of at least one second floating-point number, and
the at least one first exponent is at least one exponent of at least one first floating-point number.

4. The receiver according to claim 1, wherein the processor is further configured to:
generate a reference value based on the first soft decision value, and
calculate at least one relative value based on the reference value.

5. The receiver according to claim 1, wherein the processor is further configured to:
generate a first reference value based on the first soft decision value,
calculate at least one first relative value of the at least one relative value based on the first reference value,
generate a second reference value based on the at least one second soft decision value that corresponds to the at least one first relative value, and
calculate at least one second relative value of the at least one relative value other than the at least one first relative value, based on the second reference value.

6. The receiver according to claim 1, wherein the processor is further configured to:
generate a reference value based on another received symbol which is received prior to the received symbol, and
calculate at least one relative value based on the reference value.

7. The receiver according to claim 1, wherein the processor is further configured to:
generate a reference value such that a difference between the reference value and another reference value of a previously received symbol that is received prior to the received symbol is lower than a specified value, and
calculate at least one relative value based on the reference value.

8. The receiver according to claim 1, wherein the processor is further configured to:
generate a reference value based on the received symbol and another received symbol which is received prior to the received symbol, and
calculate at least one relative value based on the reference value.

9. The receiver according to claim 1, wherein the processor is further configured to:
generate a reference soft decision value based on soft decision values of a plurality of received symbols; and
determine relative soft decision values associated with each of the plurality of received symbols, with respect to the reference soft decision value.

10. The receiver according to claim 1, wherein the reference soft decision value comprises a common reference value to be used for the plurality of received symbols.

11. The receiver according to claim 1, wherein the processor is further configured to:
generate a reference soft decision value based on soft decision values associated with one received symbol;
set the reference soft decision value as a common reference value for a plurality of received symbols; and
determine relative soft decision values for the plurality of received symbols with respect to the common reference value.

12. The receiver according to claim 1, wherein the processor is further configured to:
determine a maximum value of exponent values of soft decision values associated with a plurality of received symbols; and
subtract a predetermined integer value from the maximum value and set a resulting value as a reference soft decision value for the plurality of received symbols; and
determine relative soft decision values for the plurality of received symbols with respect to the reference soft decision value.

13. A receiving method comprising:
calculating a plurality of soft decision values of each of a plurality of bits mapped to a received symbol;
selecting a first soft decision value from the plurality of soft decision values;
calculating at least one relative value of at least one second soft decision value in the plurality of soft decision values, each of the at least one relative value being a relative value of each of the at least one second soft decision value with respect to the first soft decision value, the first soft decision value being a soft decision value being a soft decision value of each of at least one second bit in the plurality of bits, the first bit and each of the at least one second bit being different bits in the plurality of bits mapped to the received symbol;
storing the first soft decision value and the at least one relative value in a memory; and
estimating the plurality of bits based on the first soft decision value and the at least one relative value which are stored in the memory.

14. The receiving method according to claim 9, further comprising:
converting the first soft decision value to at least one first floating-point number;
converting the at least one second soft decision value to at least one second floating-point number; and
calculating the at least one relative value based on the at least one first floating-point number and the at least one second floating-point number.

15. The receiving method according to claim 10, wherein:
the at least one relative value includes at least one relative exponent of at least one second exponent to at least one first exponent,
the at least one second exponent is at least one exponent of at least one second floating-point number, and
the at least one first exponent is at least one exponent of at least one first floating-point number.

16. The receiving method according to claim 9, further comprising:
- generating a reference value based on the first soft decision value; and
- calculating at least one relative value based on the reference value.

17. The receiving method according to claim 9, further comprising:
- generating a first reference value based on the first soft decision value;
- calculating at least one first relative value of the at least one relative value based on the first reference value;
- generating a second reference value based on the at least one second soft decision value that corresponds to the at least one first relative value; and
- calculating at least one second relative value of the at least one relative value other than the at least one first relative value, based on the second reference value.

18. The receiving method according to claim 9, further comprising:
- generating a reference value based on another received symbol which is previously received prior to the received symbol; and
- calculating at least one relative value based on the reference value.

19. The receiving method according to claim 9, further comprising:
- generating a reference value such that a difference between the reference value and another reference value of a previously received symbol that is received prior to the received symbol is lower than a specified value; and
- calculating at least one relative value based on the reference value.

20. The receiving method according to claim 9, further comprising:
- generating a reference value based on the received symbol and another received symbol which is received prior to the received symbol; and
- calculating at least one relative value based on the reference value.

* * * * *